United States Patent
Dabrowski

(10) Patent No.: US 9,633,239 B2
(45) Date of Patent: Apr. 25, 2017

(54) SYSTEM AND METHOD FOR SELECTIVE ACCESS TO RFID FUNCTIONALITY

(71) Applicant: ADVANCED DIGITAL BROADCAST S.A., Zielona Gora (PL)

(72) Inventor: Bartosz Dabrowski, Zielona Gora (PL)

(73) Assignee: ADVANCED DIGITAL BROADCAST S.A., Zielona Gora (PL)

( * ) Notice: Subject to any disclaimer, the term of this patent is extended or adjusted under 35 U.S.C. 154(b) by 29 days.

(21) Appl. No.: 14/863,606

(22) Filed: Sep. 24, 2015

(65) Prior Publication Data

US 2017/0091494 A1 Mar. 30, 2017

(51) Int. Cl.
| | |
|---|---|
| G08B 13/14 | (2006.01) |
| H05K 9/00 | (2006.01) |
| G06K 19/073 | (2006.01) |
| H04M 1/02 | (2006.01) |
| G06K 19/06 | (2006.01) |
| H01Q 1/24 | (2006.01) |
| G06K 7/10 | (2006.01) |

(52) U.S. Cl.
CPC .............................. G06K 7/10198 (2013.01)

(58) Field of Classification Search
CPC ........ G08B 13/14; H05K 9/00; G06K 19/073; G06K 19/06; H04M 1/02; H01Q 1/24
USPC .......... 340/10.1–10.5; 343/841, 702; 174/35; 235/492, 493
See application file for complete search history.

(56) References Cited

U.S. PATENT DOCUMENTS

| | | | | |
|---|---|---|---|---|
| 6,121,544 | A * | 9/2000 | Petsinger | G06K 19/005 150/147 |
| 6,176,425 | B1 * | 1/2001 | Harrison | G06K 7/0008 235/383 |
| 6,446,208 | B1 * | 9/2002 | Gujar | G06K 7/0008 713/184 |
| 7,098,794 | B2 * | 8/2006 | Lindsay | G06K 19/0716 340/539.26 |
| 7,375,631 | B2 * | 5/2008 | Moskowitz | G06K 19/07327 150/147 |
| 7,948,382 | B2 * | 5/2011 | Tuttle | G06K 7/0008 340/10.1 |
| 7,950,585 | B2 * | 5/2011 | Skowronek | G06K 19/07327 235/492 |

(Continued)

Primary Examiner — Nam V Nguyen
(74) Attorney, Agent, or Firm — Mark M. Friedman

(57) ABSTRACT

A device (100) comprising a Radio Frequency Identification transponder and means for selectively controlling the Radio Frequency Identification communication, the device (100) comprising: a first, internal, electromagnetic shield fixed on one side of the Radio Frequency Identification transponder's antenna and a second, internal, electromagnetic, movable shield (180) on the other side of the Radio Frequency Identification transponder's antenna wherein the device (100) comprises an internal actuator (170) configured to operate a movable mechanism (150), influencing the position of the movable shield, such that when the internal actuator is in a first position, the movable shield is in a first position allowing communication with the Radio Frequency Identification transponder and when the internal actuator is in a second position, the movable shield is in a second position, in which it blocks all contactless communication with the Radio Frequency Identification transponder.

6 Claims, 26 Drawing Sheets

(56) References Cited

U.S. PATENT DOCUMENTS

| | | | |
|---|---|---|---|
| 8,493,180 B2* | 7/2013 | Fontijn | G01B 7/24 |
| | | | 340/10.1 |
| 8,604,995 B2* | 12/2013 | Hammad | G06F 1/1616 |
| | | | 343/702 |
| 8,851,386 B2* | 10/2014 | Phillips | H05K 9/002 |
| | | | 206/38 |
| 9,135,548 B2* | 9/2015 | Wilczynski | G07C 9/00111 |
| 9,183,482 B2* | 11/2015 | Smith | G06K 19/07327 |
| 2007/0109130 A1* | 5/2007 | Edenfield | A45C 1/06 |
| | | | 340/572.8 |

* cited by examiner

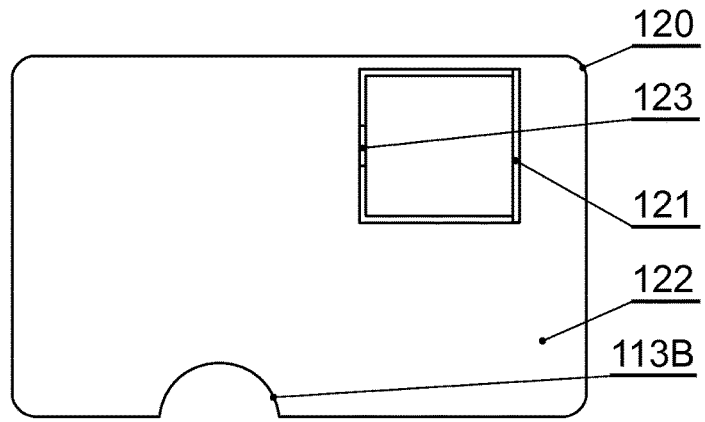
Fig. 3A
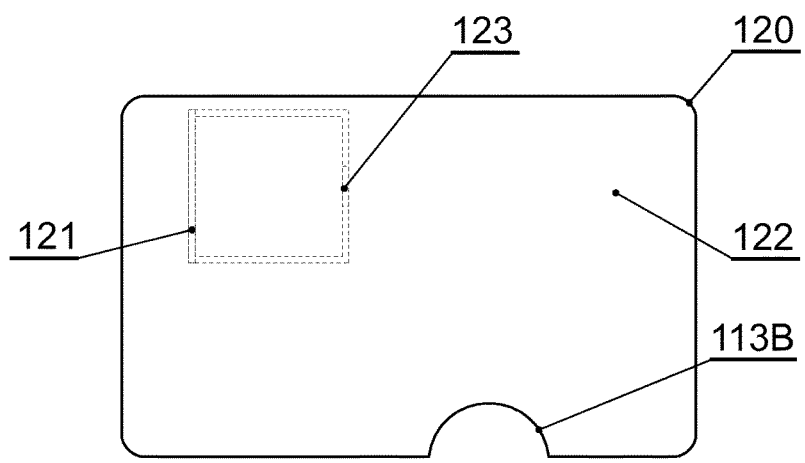
Fig. 3B
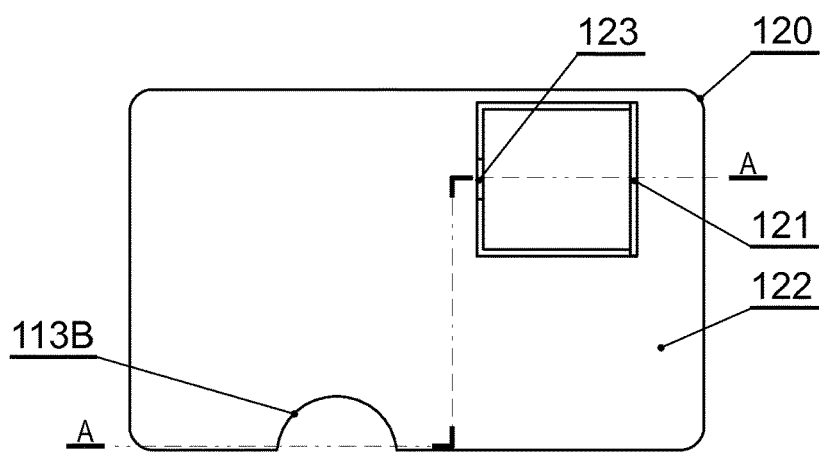
Fig. 3C
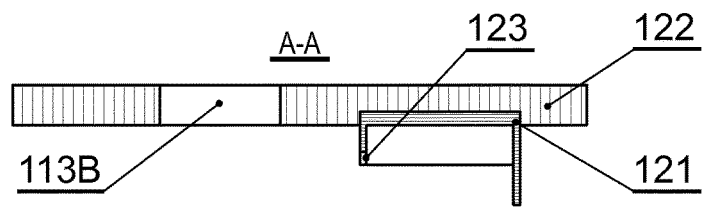

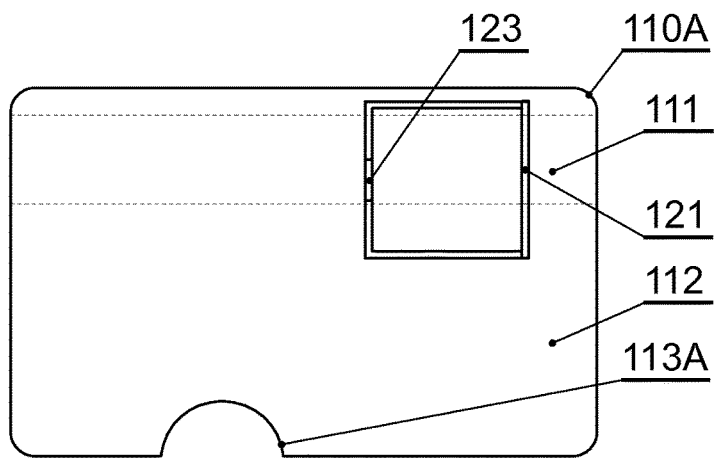
Fig. 16A
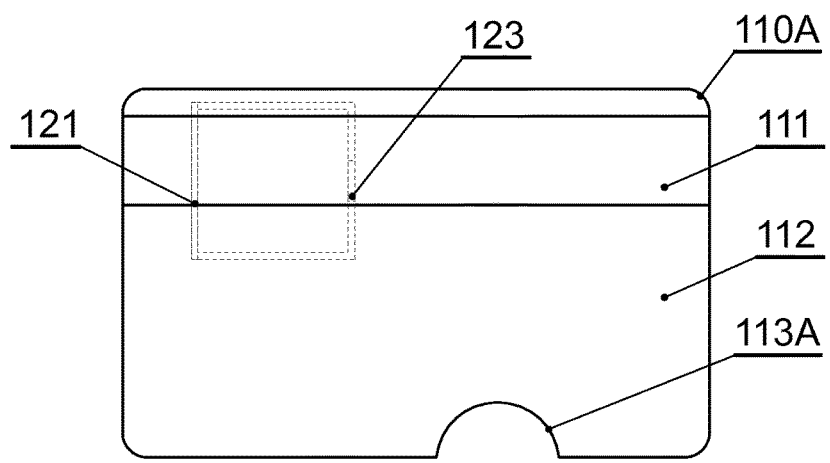
Fig. 16B
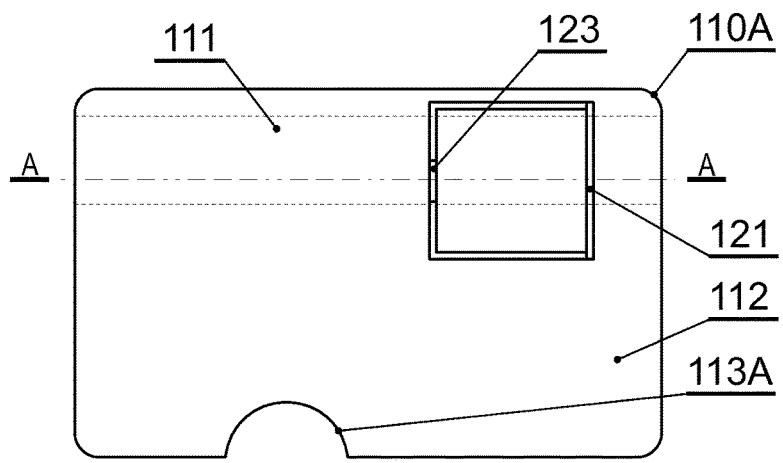
Fig. 16C
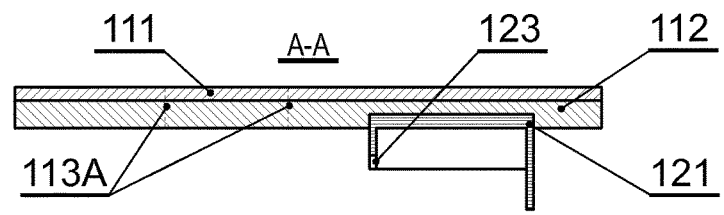

SYSTEM AND METHOD FOR SELECTIVE ACCESS TO RFID FUNCTIONALITY

TECHNICAL FIELD

The present invention relates to a system and method for selective access to RFID (Radio Frequency Identification) functionality. In particular, the present invention relates to providing a mechanism allowing an RFID user to selectively activate and deactivate RFID communication in an RFID device.

BACKGROUND

RFID tags are used in numerous situations. There are two basic types of RFID tags. Active RFID tags have a transmitter and their own power source, while passive tags have no battery as they draw power from the reader, which sends out electromagnetic waves that induce a current in the tag's antenna. Thus, passive tags are, due to lower cost, more popular.

One example of use of passive RFID tags are contactless payment credit/debit cards. Other examples include RFID passports.

RFID technology creates however a new category of threats. Typically, RFID readers may query ROD tags for their unique identifier or on-tag data. If certain vulnerabilities exist in an RFID system, an RFID tag can be cloned. Tag cloning may allow undesirable operations to be performed, such as unauthorized entry to a secure area, unauthorized purchases etc.

Thus, it would be desirable to provide a system and method for selective access to RFID, so that RFID cloning would be impossible, for example when an RFID tag is in its owner's pocket.

Prior art comprises a "Pressure activated passive RFID tag", U.S. Pat. No. 7,909,259 B2 that discloses an RFID tag, in which when no external pressure is applied to a packaging structure, a wire for transmitting power and data from an antenna is separated from an RFID chip by an air layer. When external pressure is applied to the packaging structure, the wire is connected to the RFID chip to transmit the power and data between the antenna and the RFID chip.

In this solution, a user has to press a specific spot on a card in order for the RFID tag to operate. An alternative solution would thus be advantageous that would not require such actions from user.

Another prior art WO2008008203 entitled "PROTECTIVE SLEEVE" discloses a device for shielding a contactless smartcard from intrusive reading and a method of manufacturing the same. The sleeve is sized and shaped to removably receive and hold the contactless smartcard The device is a sleeve formed by folding a laminated paper to form first, second and third flaps, where the first and second flaps are opposite to each other and connected to the third flap to define the sleeve. The laminated paper includes a shielding material and a paper product, and the shielding material prevents reading of the contactless smartcard when substantially surrounded by the sleeve. The device can include a fourth flap for sealing a contactless smartcard within the sleeve. The laminated paper can also include a first polyethylene layer and a second polyethylene layer, wherein the shielding material is positioned between the first and second polyethylene layers.

A drawback of this solution is that a sleeve requires a further action from a user and that a sleeve comprising a card cannot be used in a cash machine.

A publication of US2005236489 (A1) entitled "Portable information carrier with transponders" discloses a portable information carrier equipped with a transponder capable of being activated and deactivated during the use of said information carrier without having recourse to a specific device for actuation. This aim is reached by a portable information carrier comprising at least two substantially planar parts articulated to each other forming an assembly in which one part can be superimposed on the other, the first part includes a transponder arranged on the plane of said part, the second part includes a shielding element that extends over all or part of said part, said transponder intended to be read by means of a suitable reader that transmits an electromagnetic signal activating the transmission of a response from said transponder; wherein said transponder of the first part is positioned facing the shielding element of the second part when both parts are superimposed preventing the activation of the transponder by absorption of the signal transmitted by the reader, said activation being carried out when said parts are moved aside from each other, letting appear the transponder distant from the shielding element.

A drawback of this solution is that it includes folding sheets thus is requires a further action from a user and that such an arrangement, when used with a payments card, cannot be used in a cash machine.

Thus, there exists an unaddressed need for an improved method for selective access to RFID functionality that would be easy to use by humans and designed such that a payment card applying the invention may be used in a typical cash machine.

The aim of the development of the present invention is an improved method of selective access to RFID functionality.

SUMMARY

A first object of the present invention is a device comprising a Radio Frequency Identification transponder and means for selectively controlling the Radio Frequency Identification communication, the device comprising: a first, internal, electromagnetic shield fixed on one side of the Radio Frequency Identification transponder's antenna and a second, internal, electromagnetic, movable shield on the other side of the Radio Frequency Identification transponder's antenna wherein the device comprises an internal actuator configured to operate a movable mechanism, influencing the position of the movable shield, such that when the internal actuator is in a first position, the movable shield is in a first position allowing communication with the Radio Frequency Identification transponder and when the internal actuator is in a second position, the movable shield is in a second position, in which it blocks all contactless communication with the Radio Frequency Identification transponder.

Preferably, the internal actuator is a lever actuator and the movable mechanism is a lever.

Preferably, the lever pivots at its fulcrum and comprises a first engaging mandrel and a second engaging mandrel the lever actuator has an elongated opening; the movable shield has an elongated opening; wherein the first engaging mandrel slidably engages the elongated opening the movable shield; wherein the second engaging mandrel slidably engages the elongated opening of the lever actuator; such that the movable shield may be moved between said first and said second positions.

Preferably, the lever is right angle lever is used, the lever comprising two perpendicular rods.

Preferably, the first engaging mandrel and the second engaging mandrel are situated on the same side of the lever and in proximity to the opposite ends of the lever.

Preferably, the device comprises a push-back mechanism configured to return the pushed internal actuator to its initial position, when said push has been released.

Preferably, the movable shield and actuator are of a circular shape and rotate between a first and second positions, thereby allowing or blocking all contactless communication with the Radio Frequency Identification transponder.

Preferably, the shield and actuator are toothed and engage each other so that a rotation of the actuator results in rotation of the movable shield.

another object of the present invention is a reader device for a contactless communication device, the contactless communication device comprising a Radio Frequency Identification transponder and means for selectively controlling the Radio Frequency Identification communication; a first, internal, electromagnetic shield fixed on one side of the Radio Frequency Identification transponder's antenna and a second, internal, electromagnetic, movable shield on the other side of the Radio Frequency Identification transponder's antenna wherein the contactless communication device comprises an internal actuator configured to operate a movable mechanism, influencing the position of the movable shield, such that when the internal actuator is in a first position, the movable shield is in a first position allowing communication with the Radio Frequency Identification transponder and when the internal actuator is in a second position, the movable shield is in a second position, in which it blocks all contactless communication with the Radio Frequency Identification transponder; wherein the reader device comprises: a holder capable of holding the contactless communication device; a Radio Frequency Identification transponder capable of communication with the Radio Frequency Identification transponder of the contactless communication device; a controller, which is communicatively connected to an actuation means selectively engaging the internal actuator of the contactless communication device.

DESCRIPTION OF DRAWINGS

These and other objects of the invention presented herein, are accomplished by providing a system and method for selective access to RFID functionality. Further details and features of the present invention, its nature and various advantages will become more apparent from the following detailed description of the preferred embodiments shown in a drawing, in which:

FIG. 3A presents a front view of a stationary shield layer;

FIG. 3B presents a back view of the stationary shield layer;

FIG. 3C presents a front view and the A-A cross-section of the stationary shield layer;

FIGS. 16A-D show a combination of two previous layers into a single layer;

DETAILED DESCRIPTION

Figure 1:
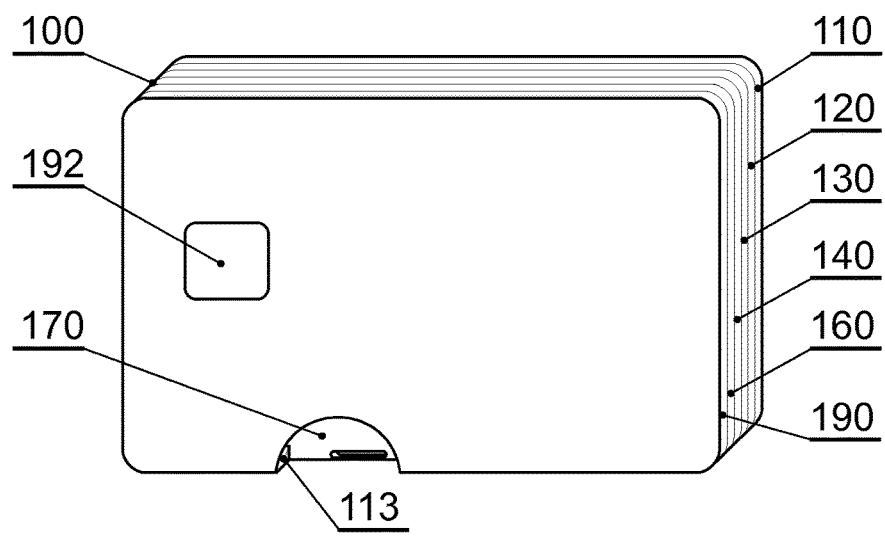
FIG. 1 presents a perspective view of a multi-layer, contactless electronic card.

The present invention describes a method for embedding an RFID shielding allowing selective access to RFID functionality inside an RFID tag such as a credit card in such a manner as to allow the usage of that card in cases that are not possible if modifications to external surfaces of the card are done. An example of such use is a use in an ordinary cash machine. Another example of such use may be a parking lot payment machine that needs to have the RFID card inserted in order to execute a payment or access or the like.

The aforementioned RFID shielding is construed as any material that filters out the signal used by the RFID chip and/or antenna for communication (i.e. an electromagnetic shield). Further, the aforementioned shielding is movable between the closed position and the open position, wherein the closed position is construed as a position, in which the RFID antenna and/or chip are at least partially covered by the shield so as to disallow the communication between an RFID transponder and the said RFID chip. Additionally, the open position is construed as a position, in which the RFID antenna and/or chip are at least partially not covered by the shield so as to allow the communication between an RFID transponder and the said RFID chip.

The present invention further describes a method to retract the shielding thus implementing access to the RFID antenna and/or chip in a manner most natural and convenient the user wherein retracting the shield is construed as moving the shield from closed to open position. Further the present invention describes a method to close the shielding thus implementing wherein closing the shield is construed as moving the shield from open to closed position.

Further the present invention presents exemplary embodiments depicting various methods of how the shielding can be embedded in the plastic coating of an RFID tag, such as a credit card, thus retaining its other functionality that may be usage in a cash machine.

RFID card construction (for example access card, payment card) typically comprises layers of differing materials each having a different function. Such functions may be proper hold of electronic elements, decorative functions, protective functions, etc.

Typical cards are made from PVC, Polyester or Polycarbonate. It is clear that the number of layers may differ from one card to another where different client requirements are considered.

Some contactless cards provide at the same time functions requiring contact, for example a contactless payment card comprising a typical magnetic stripe and/or a microchip connected to contacts present on the outer layer of the card. In such cases, the cards have standardized dimensions. For example, ISO/IEC 7816 is an international standard related to electronic identification cards with contacts, especially smart cards, managed jointly by the International Organization for Standardization (ISO) and the International Electrotechnical Commission (IEC). There are other standards such as ISO/IEC 14443 for contactless cards (PayPass, PayWave, ExpressPay). A further standard ISO/IEC 7810 ID-1, with which most credit cards are compliant, defines dimensions as 3.370×2.125 (85.60×53.98 mm) and a thickness of 0.76 min (0.030 in).

Thus, any shielding of RFID must also conform to the aforementioned standards or equivalent ones for the card to operate correctly in already deployed readers and/or cash machines.

As a general rule, dimensions are not to be inferred from the drawings. Thus, dimensions obtained merely by measuring a diagrammatic representation in the drawings do not form part of the disclosure and are not limiting to the present invention.

FIG. 1 presents a perspective view of a multi-layer, contactless electronic card according to the present invention. The card (100) comprises six layers. It is however to be noted that any number of additional layers may be present between the described layers. Such layers may provide additional protection and be for example thin films.

The first layer (110) is an informative layer comprising a magnetic stripe. The informative layer (110) will typically comprise textual and/or graphical information printed thereon. This layer is optional and may only be present when a card is to be backward compatible with magnetic stripes' readers.

The second layer (120) is a stationary shield layer. This layer, comprises a stationary electromagnetic shield the dimensions of which shall be such that it fully covers the respective antenna of the RFID. A suitable excess shield, with respect to the antenna size, may be provided even to the extent that the electromagnetic shield extends to the dimensions of the stationary layer (120). In another embodiment of the present invention, the first layer (110) may be combined with the second layer (120) in order to form a single layer.

The third layer (130) comprises the RFID transponder (tag). The fourth layer (140) is a lever support layer, the purpose of which is to receive a lever at a fixed fulcrum point as well as to define an allowable extent of movement of the lever around the fulcrum. The shield support layer (160) is a layer supporting a movable, electromagnetic shield as well as supporting a lever actuator (170).

The sixth layer (190) is an informative layer comprising a microchip (such as an EMV chip). Such contact cards must be physically inserted (or "dipped") into a reader since the outer layer comprises microchip contacts (192). The microchip itself may be embedded in the same layer. This layer is optional and may only be present, when a card is to be backward compatible with chip data readers. In another embodiment of the present invention, the shield support layer (160) may be combined with the sixth layer (190) in order to form a single layer.

In other words a card (100) with an RFID tag comprising an antenna, is designed such that the card (100) has a first, internal, electromagnetic shield fixed on one side of the antenna and a second, internal, electromagnetic, movable shield on the other side of the antenna wherein the card (100) comprises an internal actuator operating a movable mechanism, influencing the position of the movable shield, such that when the internal actuator is in a first position, the movable shield is in a first position allowing communication with the RFID tag and when the internal actuator is in a second position, the movable shield is in a second position, in which it blocks all contactless communication with the RFID tag.

Figure 2A:
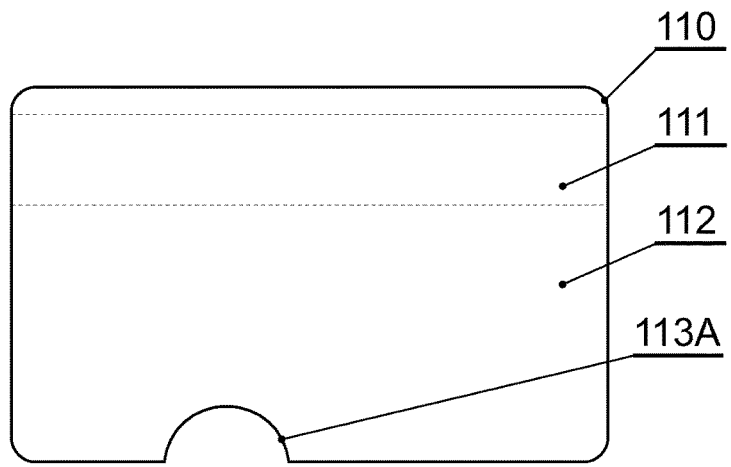
FIG. 2A presents a front view of an informative layer with a magnetic stripe.
Figure 2B:
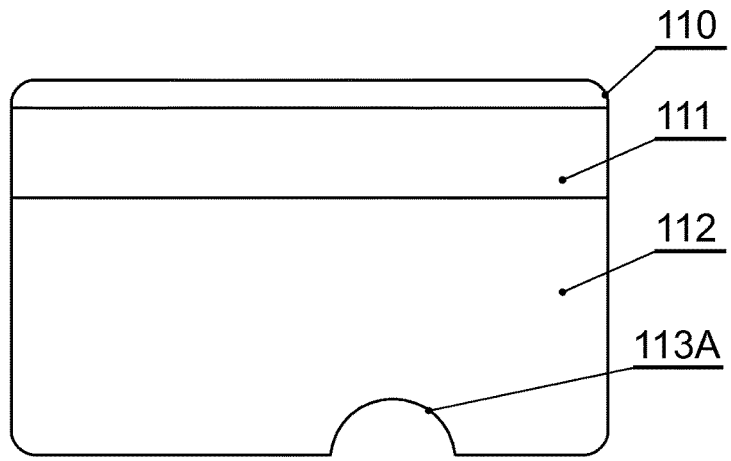
FIG. 2B presents a back view of the informative layer with a magnetic stripe.
Figure 2C:
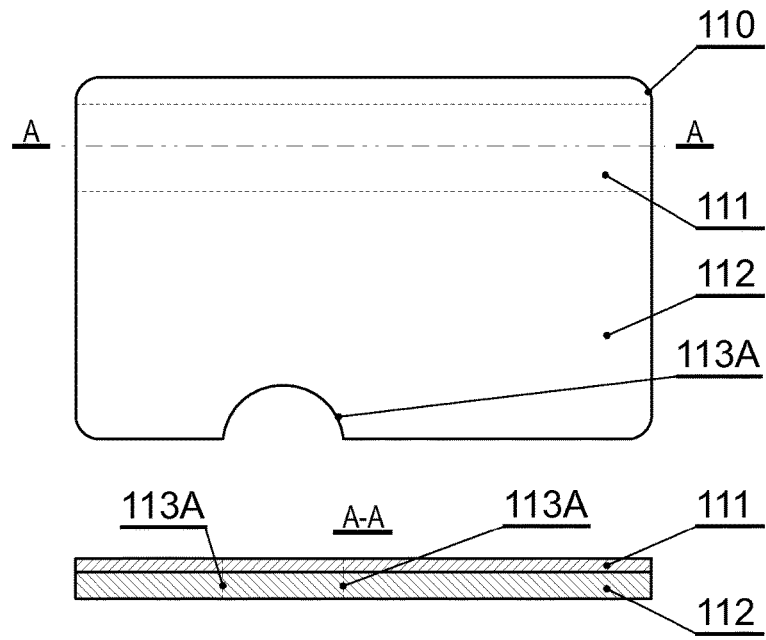
FIG. 2C presents a front view and a A-A cross-section of the informative layer with a magnetic stripe.
Figure 2D:
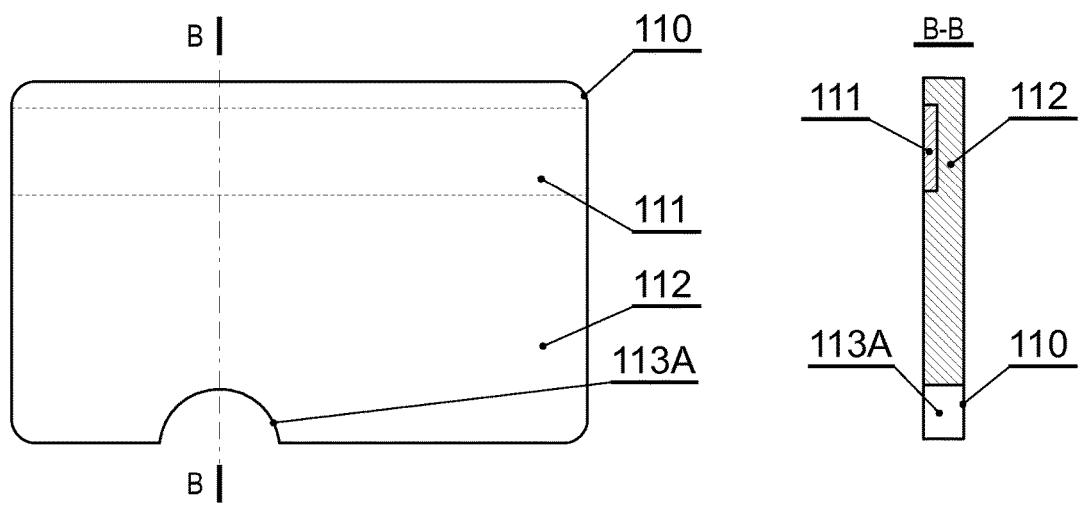
FIG. 2D presents a front view and a B-B cross-section of the informative layer with a magnetic stripe.

FIG. 2A presents a front view of an informative layer (110) with a magnetic stripe (111). A magnetic stripe (111) is present on a substrate (112) being typically PVC, Polyester or Polycarbonate or similar material. The informative layer (110) comprises a cut out portion (113A) allowing for actuating the lever actuator (170). Similarly, FIG. 2B presents a back view of an informative layer with a magnetic stripe, FIG. 2C presents a front view and an A-A cross-section of the informative layer with a magnetic stripe and FIG. 2D presents a front view and a B-B cross-section of the informative layer with a magnetic stripe.

FIG. 3A presents a front view of the stationary layer (120). This layer may typically be constructed of PVC, Polyester or Polycarbonate or similar material and serves as a substrate (122) for the stationary shield (121). The shield is constructed of a material blocking contactless communication as mentioned earlier by the present invention. The stationary layer (120) also contains a cut out portion (113B) allowing for actuating the lever actuator (170). FIG. 3B presents a back view of the stationary layer (120).

FIG. 3C presents a front view and the A-A cross-section of the stationary shield layer (120). The A-A cross-section shows the stationary shield's sides extending from the stationary (120) layer. An extended part of the stationary shield (121), protruding from the stationary (120) layer, is to be embedded in the subsequent layers (130) and (140) comprising appropriate cut out portions for receiving the extended part of the stationary shield (121) as will be shown in subsequent figures.

The aforementioned sides of the stationary shield (121), are those parts of the stationary shield (121) that are preferably perpendicular to the stationary layer (120) and are purposed to block the contactless communication on the sides of the antenna (132) and/or chip (131). The stationary shield preferably contains a cut-out part (123) that allows the subsequent layers be joint with the stationary layer (120) retaining one continuous volume. This feature will become more apparent if observing element (135) in FIG. 4C, into which the shield (121) is embedded.

Figure 3D:
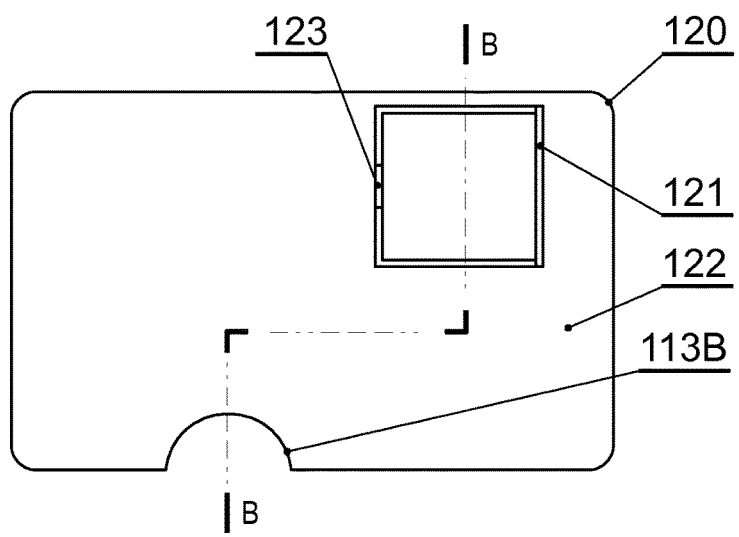
FIG. 3D presents a front view and the B-B cross-section of the stationary shield layer.
Figure 3D:
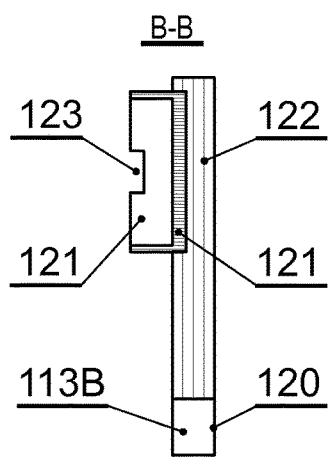

FIG. 3D presents a front view and the B-B cross-section of the stationary layer (120) on which the perpendicular sides of the shield (121) and the cut-out part (123) are made more apparent.

Figure 4A:
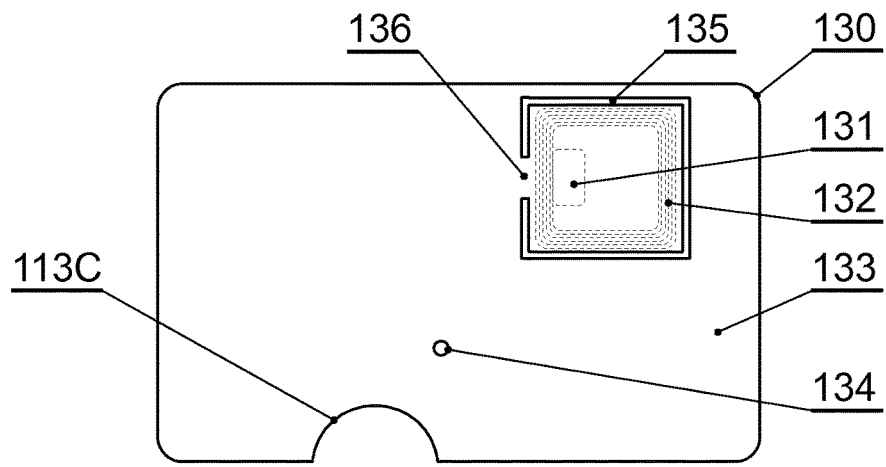
FIG. 4A presents a front view of an RFID transponder layer.

FIG. 4A presents the RFID transponder layer (130) comprising an RFID chip (131) and an RFID antenna (132). Both the RFID chip (131) and RFID antenna (132) are preferably embedded into a PVC, Polyester or Polycarbonate or similar material substrate (133). It is to be noted, that the presented location of the RFID chip (131) and RFID antenna (132) are examples only and the respective elements may be positioned differently on the RFID transponder layer (130). In case of a different location the remaining elements of the present invention would have to be repositioned correspondingly.

Additionally, the RFID transponder layer (130) is equipped with a cut-through (135) that allows the shield (121) to be slid into the cut-through (135) when the layers are assembled together. The cut-through is only partial at area (136) allowing the RFID transponder layer (130) to be assembled as a single, continuous volume. Further, the RFID transponder layer comprises an opening or a recess (134) allowing the lever fulcrum (rotation point) (151) to be inserted into the RFID transporter layer (130). The RFID transponder layer (130) also comprises a cut out portion (113C) allowing for actuating the lever actuator (170).

Figure 4B:
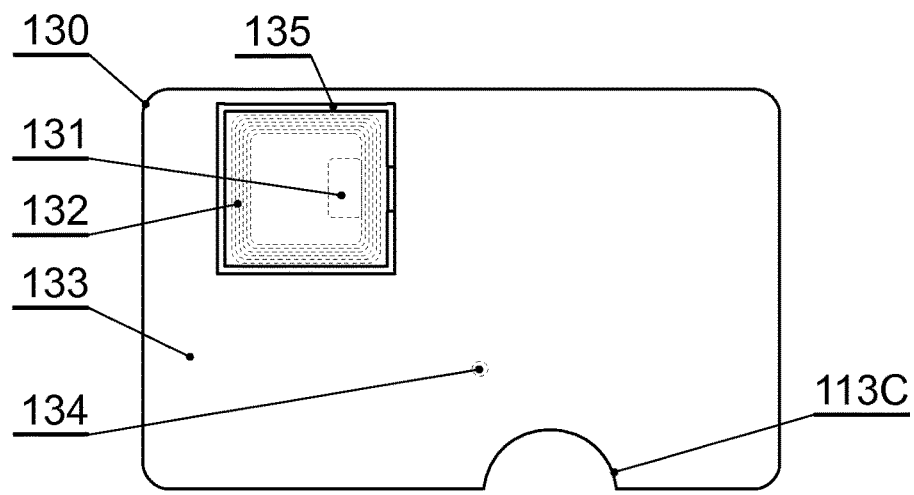
FIG. 4B presents a back view of the RFID transponder layer.
Figure 4C:
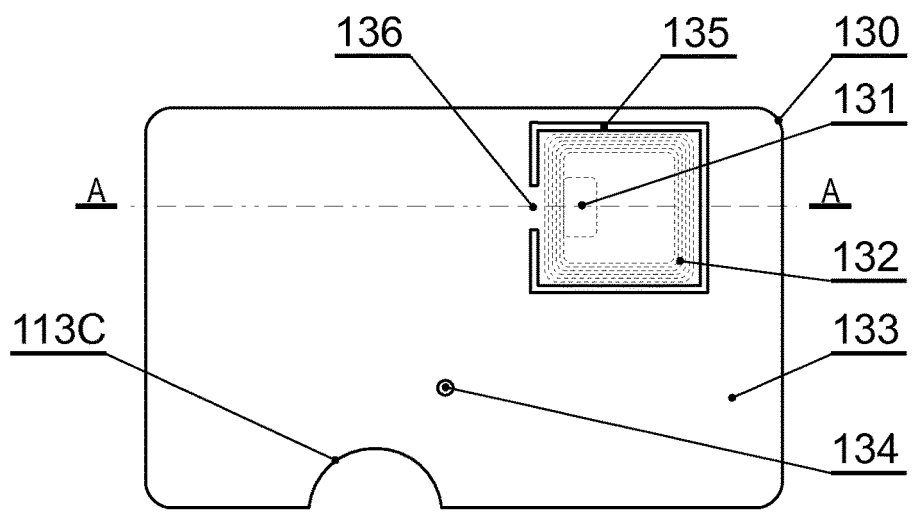
FIG. 4C presents a front view of the RFID transponder layer and an A-A cross-section of the RFID transponder layer.
Figure 4C:
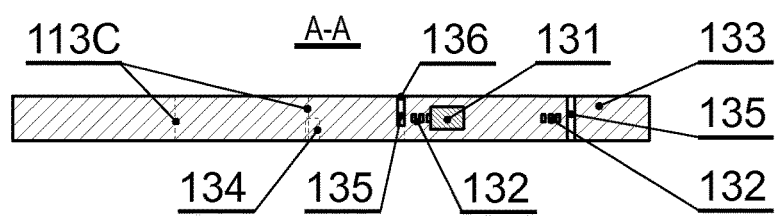

FIG. 4B presents a back view of the RFID transponder layer (130) while FIG. 4C presents a front view of the RFID transponder layer (130) and the A-A cross-section of the RFID transponder layer. It is apparent from FIG. 4C that the cut-through (135) at area (136) allows the RFID transponder layer (130) to be constructed as one continuous volume as previously mentioned in the present invention.

Figure 4D:
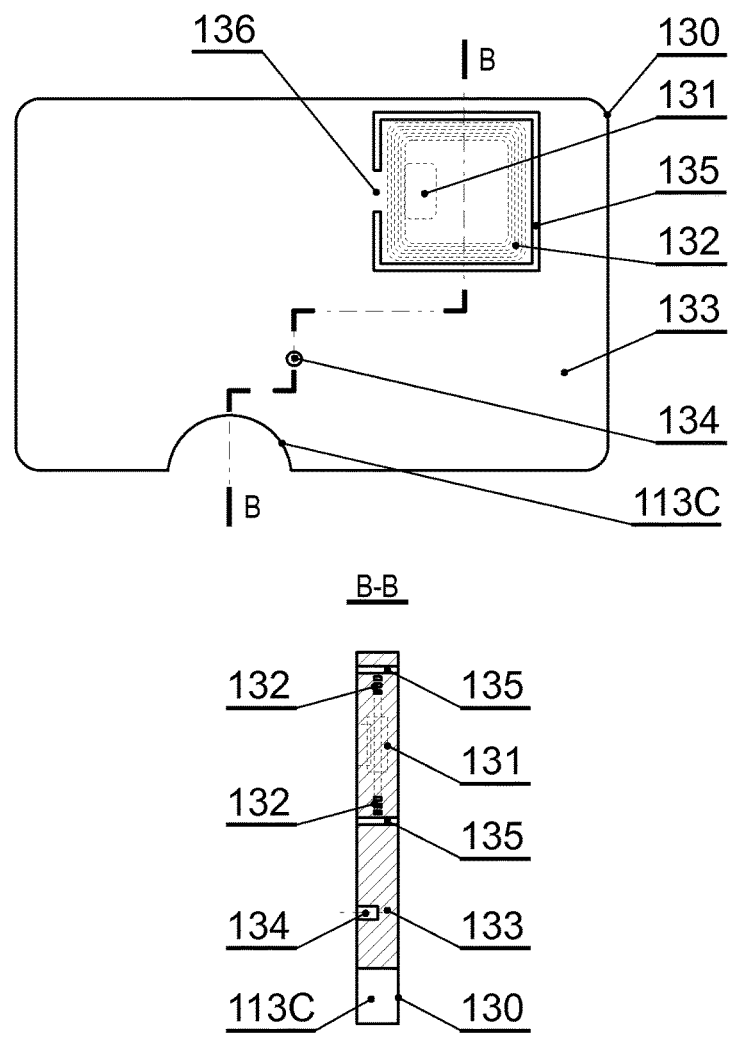
FIG. 4D presents a front view of the RFID transponder layer and a B-B cross-section of the RFID transponder layer.

FIG. 4D presents a front view of the RFID transponder layer (130) and the B-B cross-section of the RFID transponder layer (130). It is apparent to one skilled in the art that the RFID chip (131) and/or the antenna (132) may be embedded into the substrate or printed on its surface or inserted into a dedicated cut-out in the substrate or the like, which is in no way limiting to the present invention.

Figure 5A:
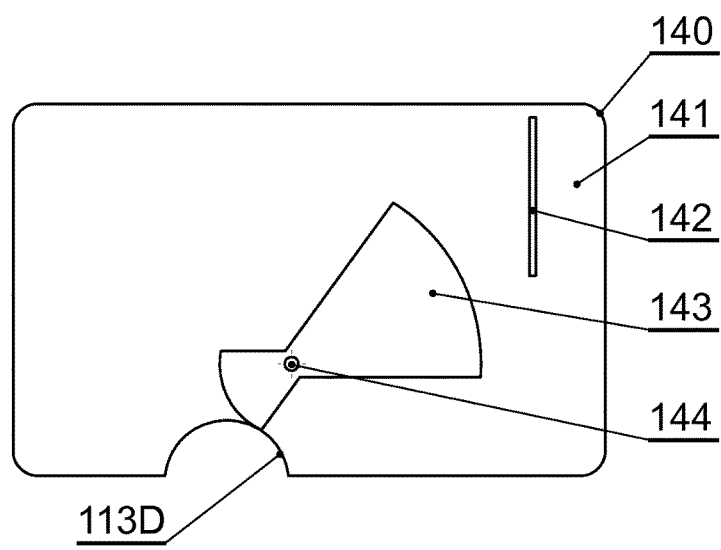
FIG. 5A presents a lever support layer.

FIG. 5A presents the lever support layer (140). This layer is typically constructed using PVC, Polyester or Polycarbonate or similar material (141). The lever support layer (140) comprises a cut-through (142) that allows the shield (121) be slid into the cut-through (142) when the layers are assembled together. It is apparent to one skilled in the art that the cut-through (142) may be extended or reduced to facilitate a different shape of the shield (121) e.g. the shield (121) may more closely encapsulate the RFID components (131) and (132) or have larger or smaller sides or the like which is in no way limiting to the present invention.

The lever support layer (140) comprises a recess portion (143) that holds the lever (150) and allows for its movement. An opening (144) allows the lever (150) to be fixed at its fulcrum (rotation point) (151). The lever support layer (140) also comprises a cut out portion (113D) allowing for actuating the lever actuator (170).

Figure 5B:
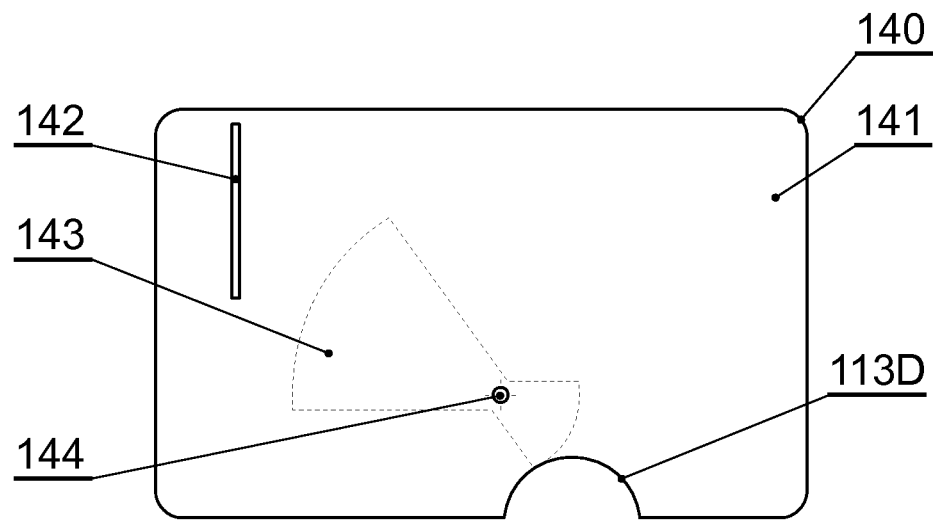
FIG. 5B presents a back view of the lever support layer.
Figure 5C:
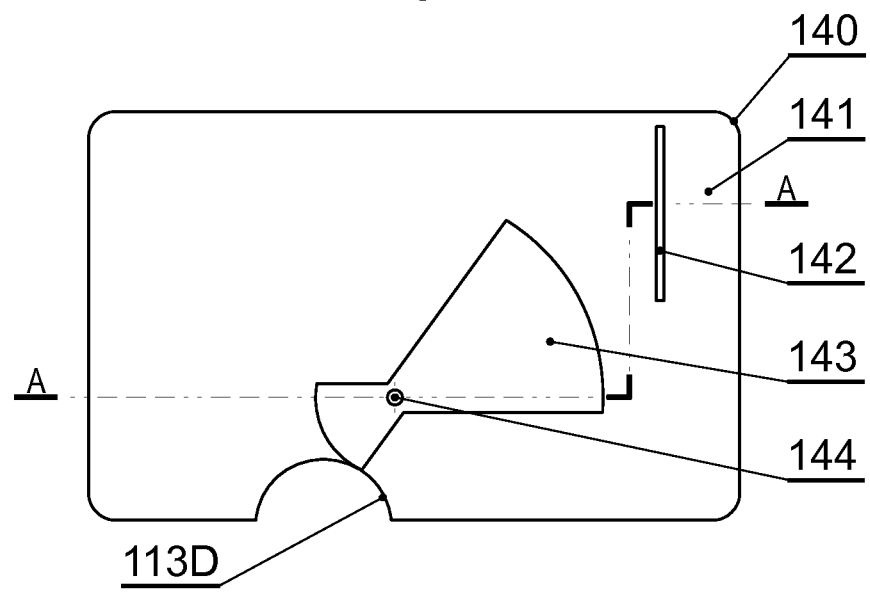
FIG. 5C presents a front view of the lever support layer and an A-A cross-section of the lever support layer.
Figure 5C:
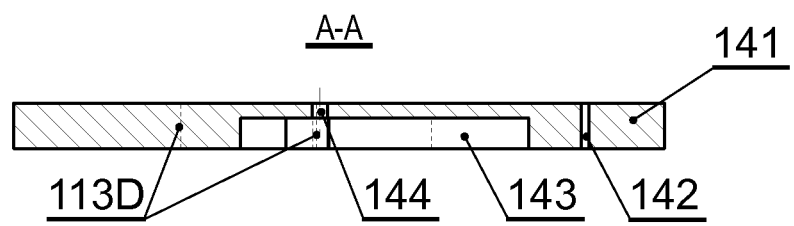
Figure 5D:
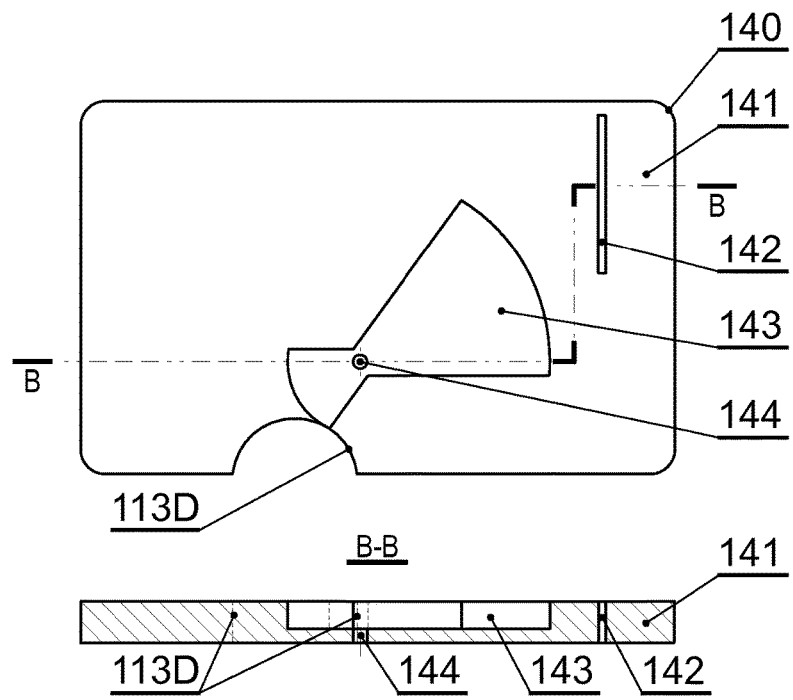
FIG. 5D presents a front view of the lever support layer and a B-B cross-section of the lever support layer.

FIG. 5B present a back view of the lever support layer (140), while FIG. 5C presents a front view of the lever support layer (140) and an A-A cross-section of the lever support layer (140) and FIG. 5D presents a front view of the lever support layer (140) and a B-B cross-section of the lever support layer.

In another embodiment of the present invention, the recess portion (143) is a cut-out portion and the opening (144) is not present while the lever (150) is mounted in the layers adhering to the lever support layer (140). In such an embodiment the lever (150) may be thicker, thereby making it more rigid.

Figures 6A, 6B:
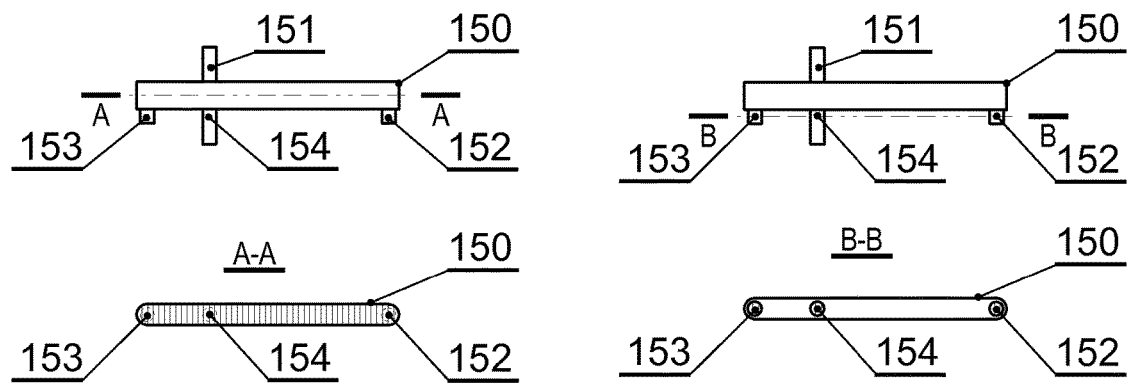
FIG. 6A presents a top view of the lever as well as its cross-section along an A-A plane.
FIG. 6B presents a top view of the lever as well as its cross-section along a B-B plane.

FIG. 6A presents a top view of the lever (150) as well as its cross-section along an A-A plane.

A lever is a machine comprising a rigid rod pivoted at a fixed hinge, or fulcrum. It is one of the six simple machines. A lever amplifies an input force to provide a greater output force, which is said to provide leverage. The ratio of the output force to the input force is the mechanical advantage of the lever.

A particular kind of lever is "Resistance in the middle" type, wherein the effort is applied on one side of the resistance, and the fulcrum is located on the other side. This kind of levers is sometimes referred to as Class 2 levers.

The rigid rod is split into two uneven sections whereby r1 is a length of the rigid rod and r2 is the length of the shorter of the two sections and r3 is the length of the longer of the two sections (r2<r3).

The lever (150) has a first fulcrum protrusion (151) on a first side its fulcrum and a second fulcrum protrusion (154) on a second side its fulcrum. The first fulcrum protrusion (151) engages the opening (134), while the second fulcrum protrusion (154) engages an opening (162). In one of the embodiments, the first protrusion (151) passes via the opening (144).

Figure 10:
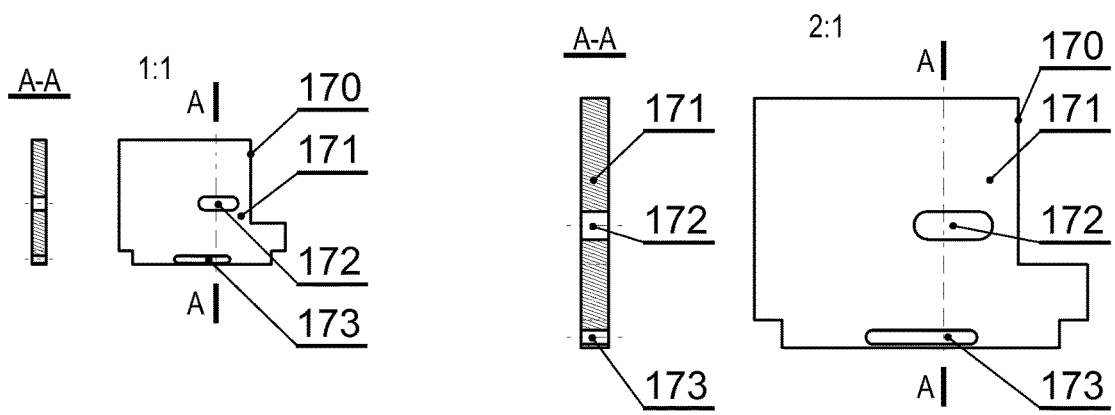
FIG. 10 shows a top view of the lever actuator and its A-A cross-section in 1:1 and 2:1 scales.

Further, the lever (150) has a first engaging mandrel (152) and a second engaging mandrel (153). The first engaging mandrel (152) slidably engages an elongated opening (182)

in a slidable shield (180) (shown in FIG. 11), while the second engaging mandrel (153) slidably engages an elongated opening (172) in the lever actuator (170) (shown in FIG. 10). Thus, the first engaging mandrel (152) slidably moves in the elongated opening (182) in a slidable shield (180), while the second engaging mandrel (152) slidably moves in the elongated opening (172) in the lever actuator (170), the movement being constrained by the lever (150) and other elements that will be presented in details in the subsequent figures.

Preferably, the first engaging mandrel (152) and the second engaging mandrel (153) are situated on the same side of the lever (150) and in proximity to the opposite ends of the lever (150). Therefore, a proper movement of the lever actuator (170) results in a proper movement of the slidable shield (180) and a suitable mechanical advantage is thereby created.

FIG. 6B presents a top view of the lever (150) as well as its cross-section along a B-B plane. The same items as in FIG. 6A are shown in a different cross-section.

Figure 7A:
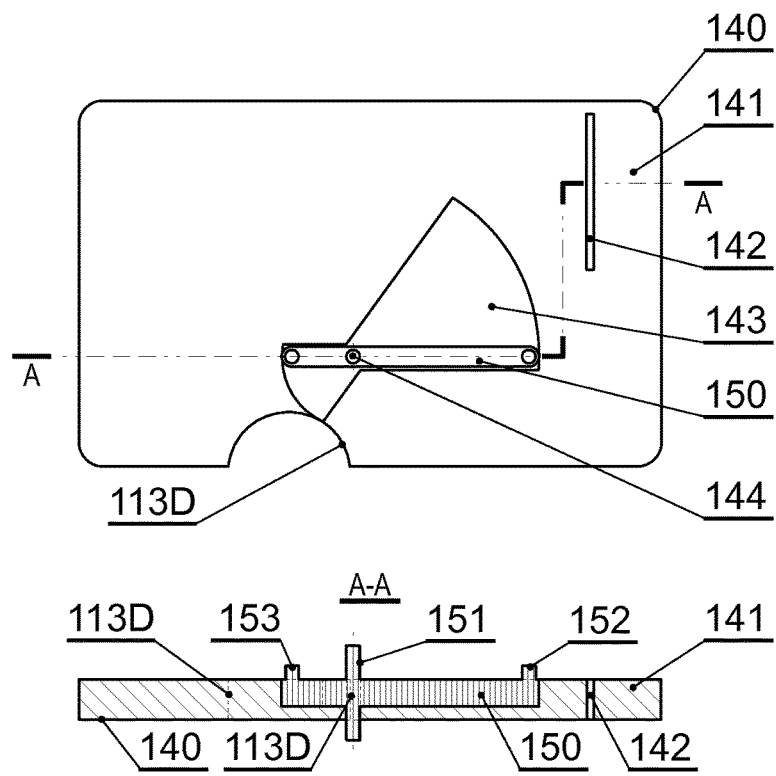
FIG. 7A presents a front view of the lever support layer with the lever mounted in it as well as a cross-section, of such an assembly, along an A-A plane.

FIG. 7A presents a front view of the lever support layer (140) with the lever (150) mounted in it as well as a cross-section, of such an assembly, along an A-A plane. All the elements have been shown in the previous figures, while FIG. 7A only presents a partially assembled view.

Figure 7B:
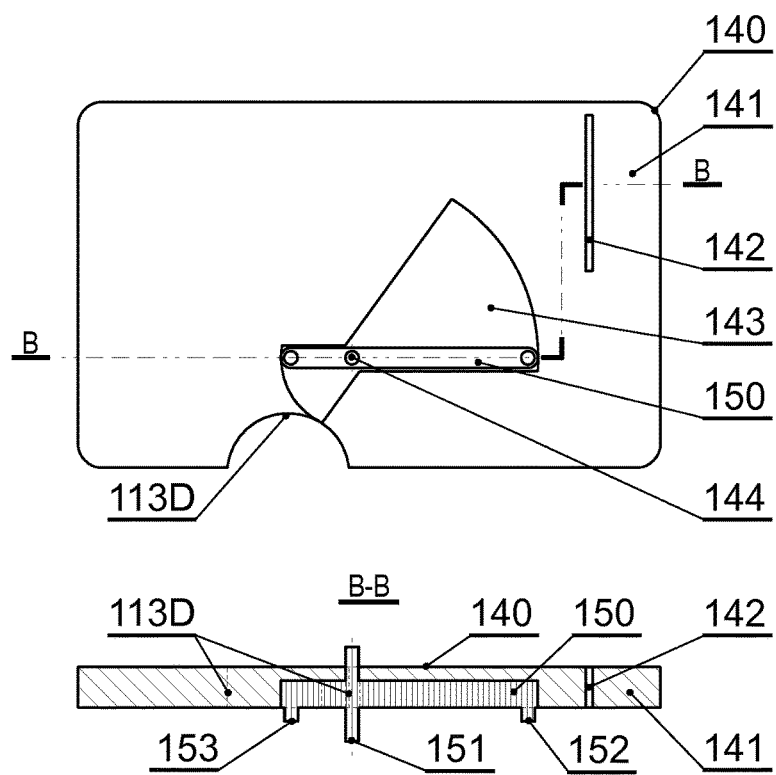
FIG. 7B presents a front view of the lever support layer with the lever mounted in it as well as a cross-section, of such an assembly, along a B-B plane.

FIG. 7B presents a front view of the lever support layer with the lever mounted in it as well as a cross-section, of such an assembly, along a B-B plane indicated in the drawing.

Figure 8:
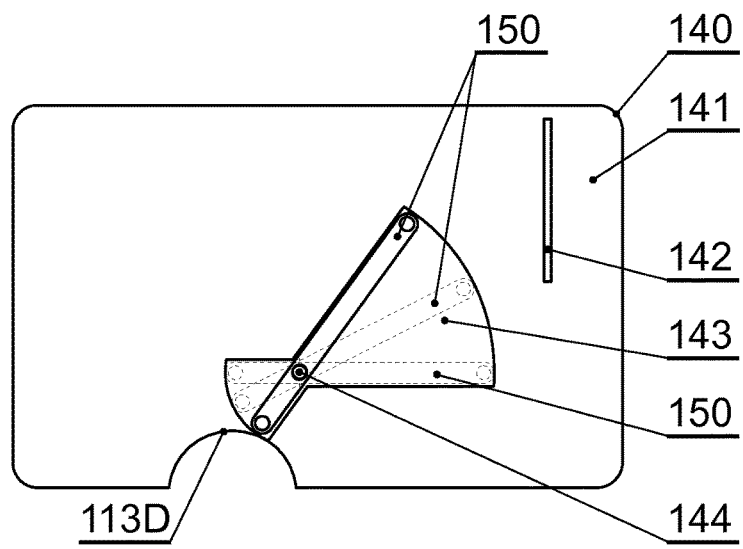
FIG. 8 shows a front view of the lever support layer with the lever mounted in it in three of many possible positions.

FIG. 8 shows a front view of the lever support layer (140) with the lever (150) mounted in it in three of many possible positions in the recess (143). The lever (150) pivots around its fulcrum in the recess (143).

Figure 9A:
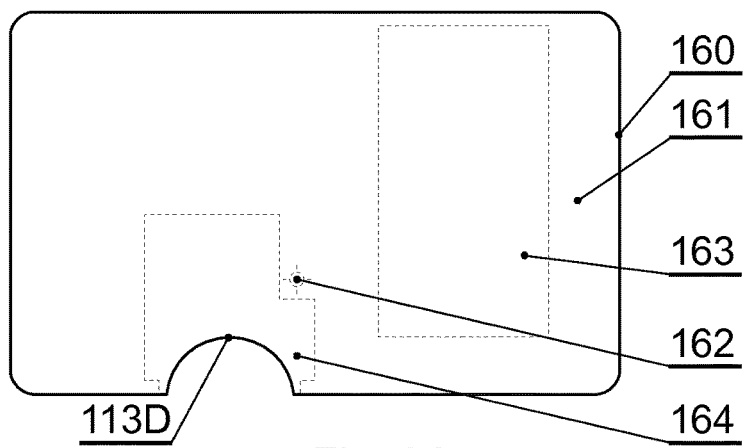
FIG. 9A presents a front view of a shield support layer.

FIG. 9A presents a front view of the shield support layer (160). The shield support layer (160) is the layer supporting a movable, electromagnetic shield as well as supporting a lever actuator (170). This layer is typically constructed using PVC, Polyester or Polycarbonate or similar substrate material (161). As previously explained, the shield support layer (160) comprises the opening (162) (which in other embodiment may be a recess) for receiving the second fulcrum protrusion (154) of the lever (150). This provides a support for the rotating fulcrum of the lever (150).

Further, the shield support layer (160) comprises a recess (163) for the slidable shield (180). The recess (163) may be an opening allowing for the second engaging mandrel (153) to be longer and thus giving more support for the slidable shield (180). Similarly, the shield support layer (160) comprises a recess (164) for lever actuator (170). The recess (164) may be an opening allowing for the first engaging mandrel (152) to be longer thus giving more support for lever actuator (170).

Figure 9B:
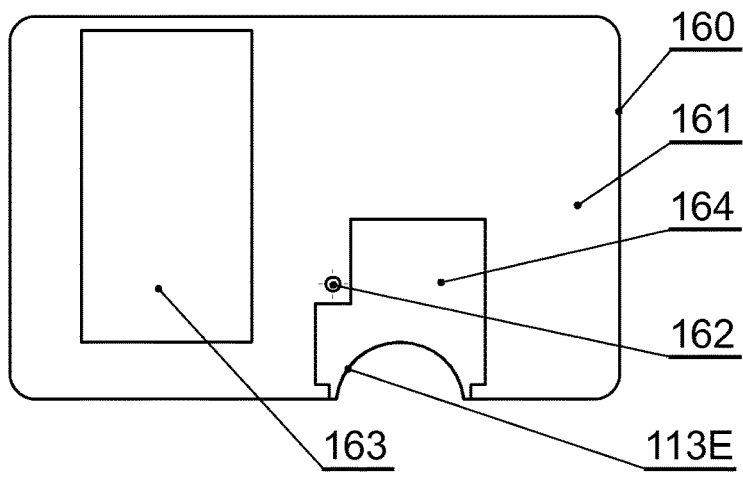
FIG. 9B shows a back view of the shield support layer.
Figure 9C:
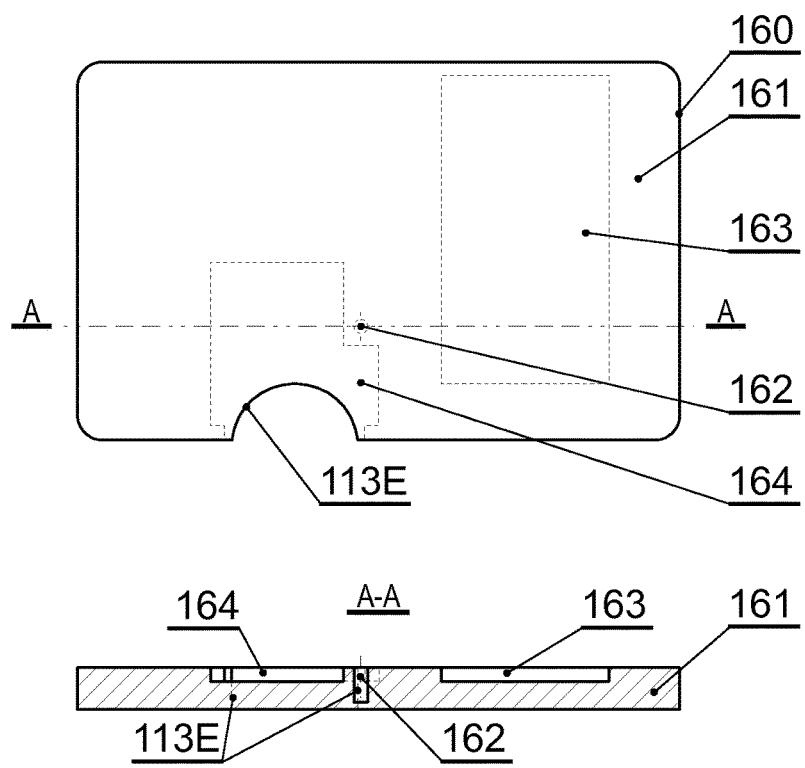
FIG. 9C presents a front view and a cross-section of the shield support layer along an A-A plane.
Figure 9D:
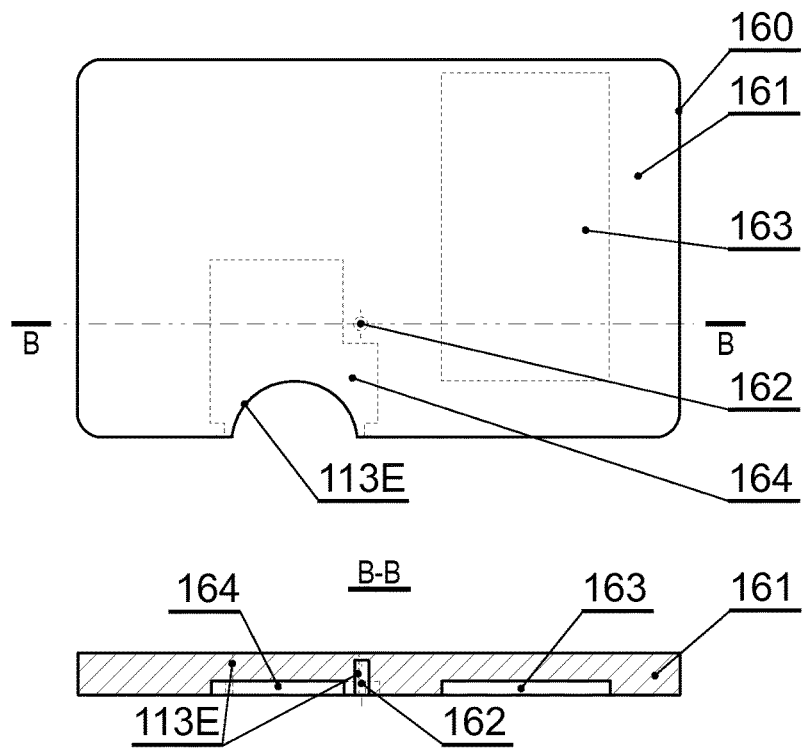
FIG. 9D presents a front view and a cross-section of the shield support layer along a B-B plane.

FIG. 9B shows a back view of the shield support layer while FIG. 9C presents a front view and a cross-section of the shield support layer (160) along an A-A plane. FIG. 9D presents a front view and a cross-section of the shield support layer (160) along a B-B plane. All the elements have been shown in the previous figures. The shield support layer (160) also comprises a cut out portion (113E) allowing for actuating the lever actuator (170).

Figure 9E:
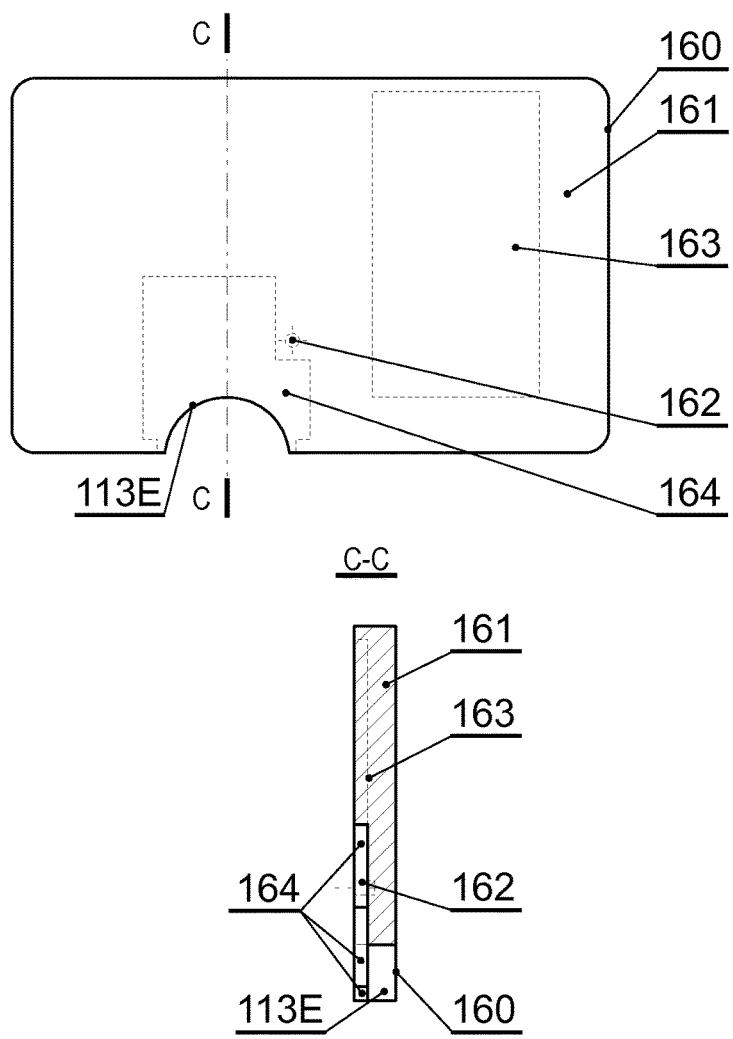
FIG. 9E presents a front view and a cross-section of the shield support layer along a C-C plane.

FIG. 9E presents a front view and a cross-section of the shield support layer (160) along a C-C plane.

FIG. 10 shows a top view of the lever actuator (170) and its A-A cross-section in 1:1 and 2:1 scales. The lever actuator (170) and the corresponding recess (164) are preferably formed such that when assembled and covered by the adhering layers (140, 190) the lever actuator may not be pushed too far and may not be pulled out of the card.

In another embodiment of the lever actuator (170) and the corresponding recess (164), there is present a push-back mechanism configured to return the pushed lever actuator (170) to its initial position, when said push (for example, user pushing the lever actuator) has been released. Such a push-back mechanism may be a suitable spring or other elastic arrangement, providing the function of returning the lever actuator (170) to its initial position.

The lever actuator (170) comprises a body (171), the elongated opening or recess (172) for receiving the first engaging mandrel (152) and preferably a thicker portion (173) for more easy actuation of the lever actuator (170). In case the aforementioned push-back mechanism is not present, the thicker portion (173) allows to grab and pull the lever actuator (170) back in order to secure the corresponding RFID chip (131) and/or RFID antenna (132). It is clear that the shape of the lever actuator (170) may be different as long as it is suitable to actuate the lever (150) resulting in selective allowing or blocking the communication by the corresponding slidable shield (180).

Figure 11:
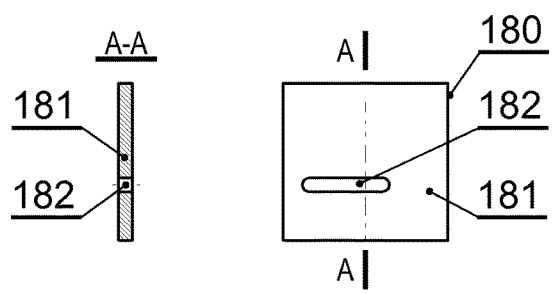
FIG. 11 shows a top view of the slidable shield) and its cross-section along an A-A plane.

FIG. 11 shows a top view of the slidable shield (180) and its cross-section along an A-A plane. The slidable shield (180) comprises a body (181), the elongated opening or recess (182) for receiving the second engaging mandrel (153). It is clear that the shape of the slidable shield (180) may be different as long as it is suitable to block electromagnetic waves.

Figure 12:
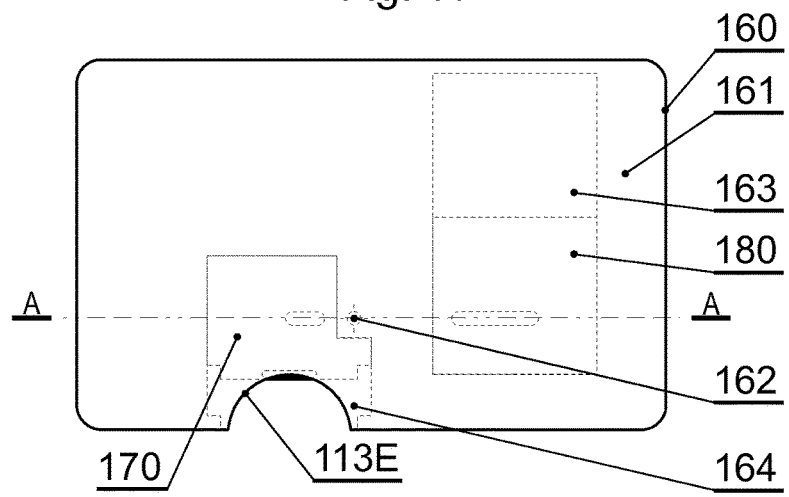
FIG. 12 presents a front view the shield support layer and a cross-section along an A-A plane, when the slidable shield and the lever actuator are mounted in the shield support layer.
Figure 12:
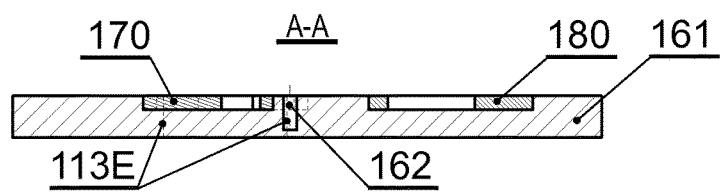

FIG. 12 presents a front view the shield support layer and a cross-section along an A-A plane, when the slidable shield and the lever actuator are mounted in the shield support layer. The lever actuator (170) is pushed in into the recess (164), while the slidable shield (180) reveals the location of the RFID transponder. In such an arrangement, the lever (150) is preferably in a horizontal position (parallel to the longer edges of a typical RFID contactless card).

Figure 13A:
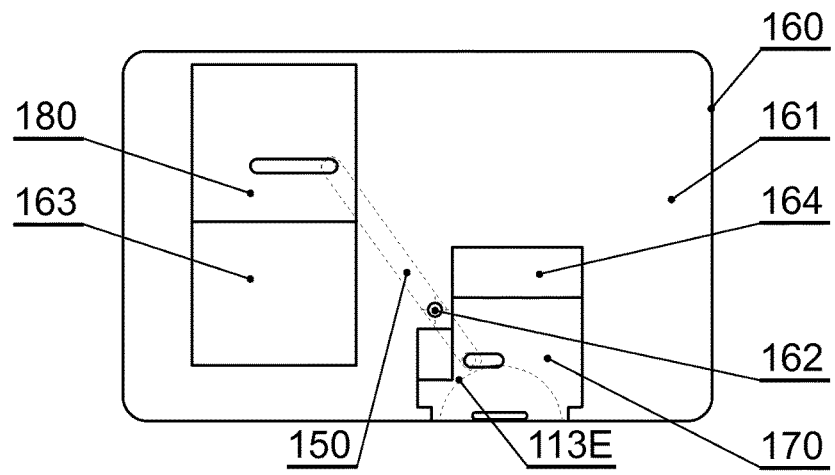
FIGS. 13A-13B show back views of the shield support layer, when there have been assembled the slidable shield, the lever actuator while the areas of RFID and/or RFID antenna are uncovered and covered.
Figure 13B:
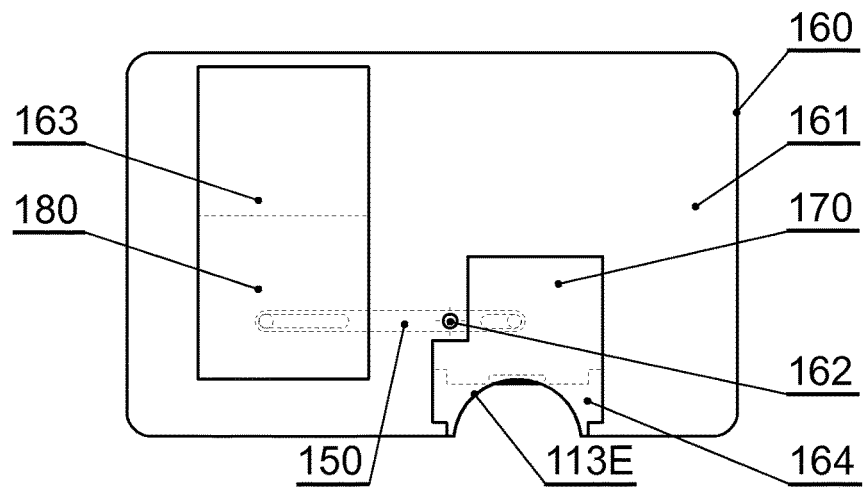

FIGS. 13A-13B show back views of the shield support layer (160), when there have been assembled the slidable shield (180), the lever actuator (170) while the areas of RFID (131) and/or RFID antenna (132) are uncovered (communication is possible FIG. 13A) and covered (communication is impossible FIG. 13B). Additionally, respective lever (150) positions have been depicted.

Figure 14A:
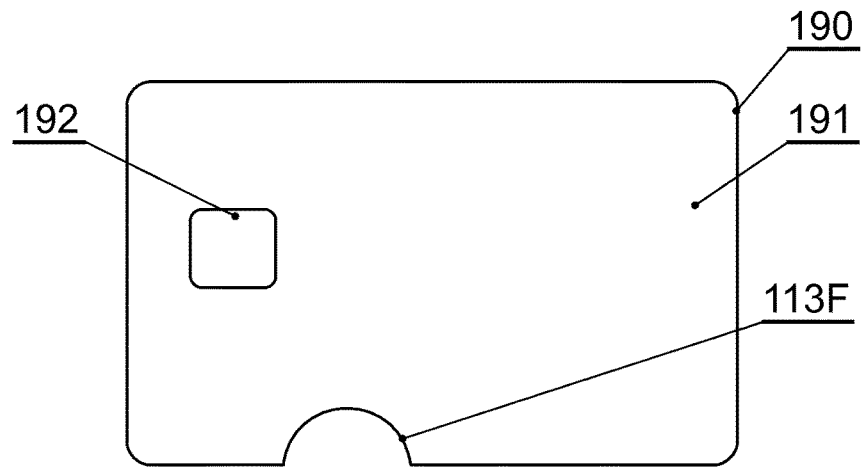
FIG. 14A presents a front view of the sixth layer comprising the microchip and its external contacts.
Figure 14B:
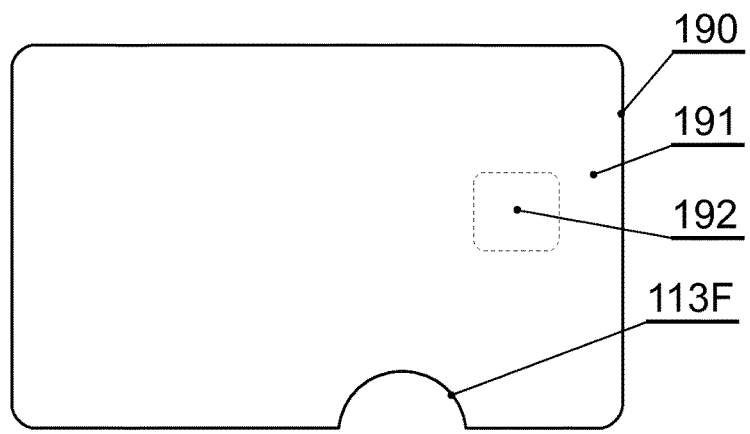
FIG. 14B presents a back view of the sixth layer comprising the microchip.

FIG. 14A presents a front view of the sixth layer (190) comprising the microchip (such as an EMV chip) and its external contacts (192). This layer is typically constructed using PVC, Polyester or Polycarbonate or similar substrate material (191) and comprises a cut out portion (113F) allowing for actuating the lever actuator (170). FIG. 14B presents a back view of the sixth layer (190) comprising microchip.

Figure 14C:
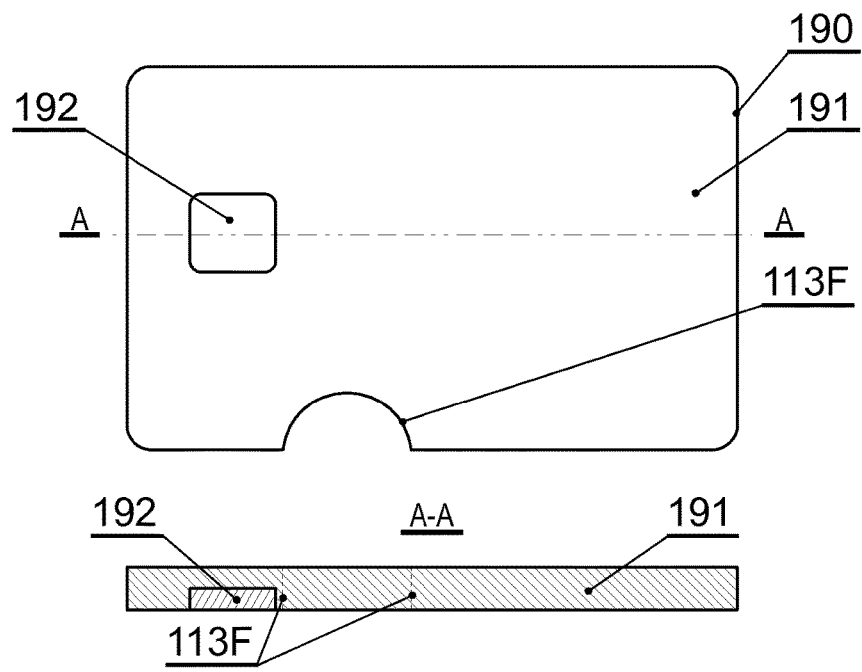
FIG. 14C shows a front view of the sixth layer and its cross-section along an A-A axis.
Figure 14D:
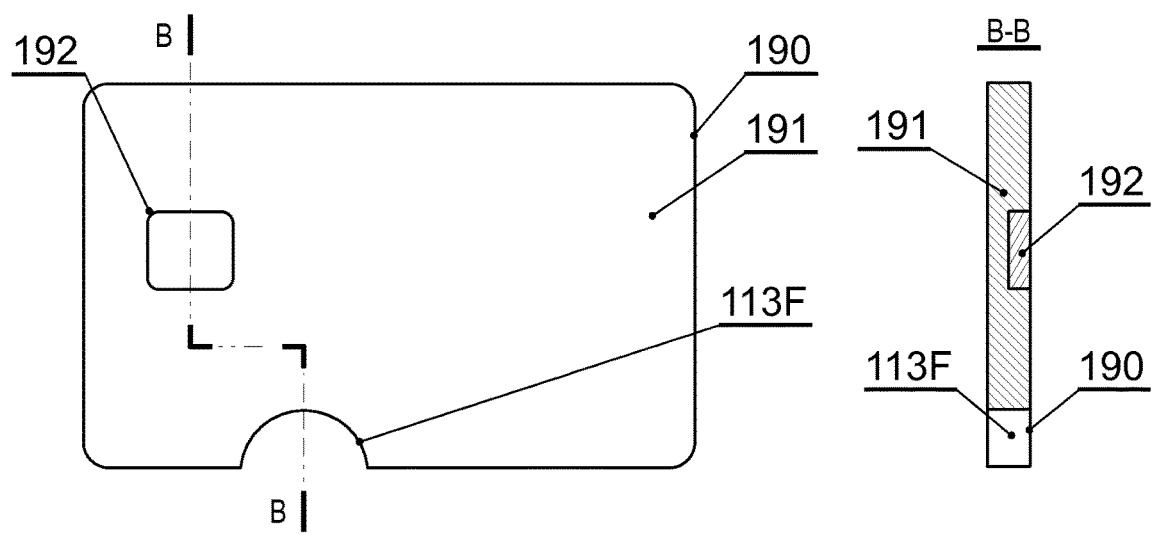
FIG. 14D shows a front view of the sixth layer and its cross-section along a B-B axis.

FIG. 14C shows a front view of the sixth layer (190) and its cross-section along an A-A axis, while FIG. 14D shows a front view of the sixth layer (190) and its cross-section along a B-B axis.

Figure 15:
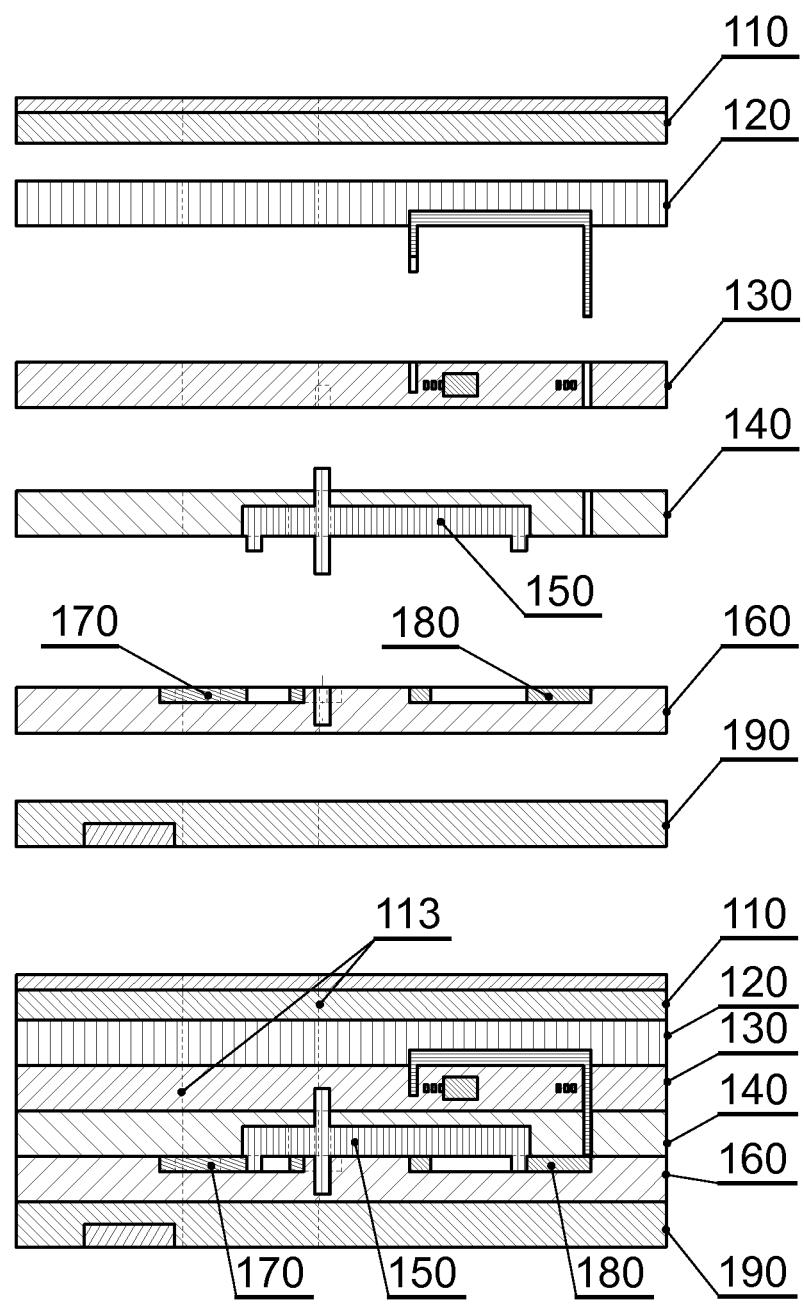
FIG. 15 presents cross-sections of all aforementioned layers as well as their assembled view.
Figure 16D:
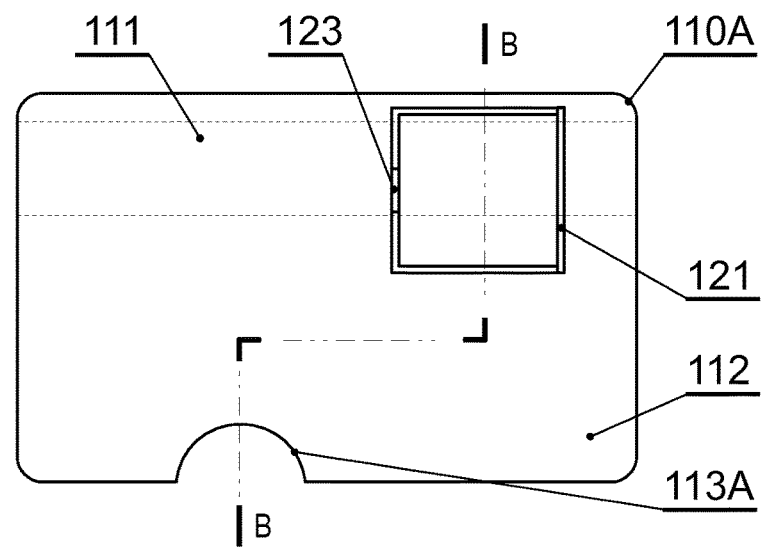
Figure 16D:
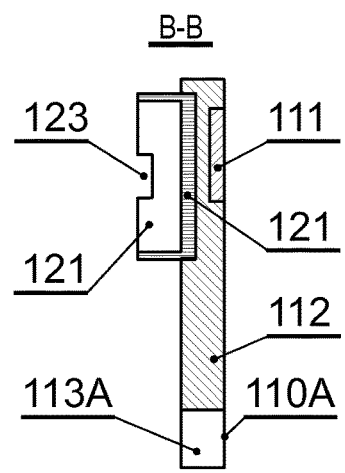
Figure 17A:
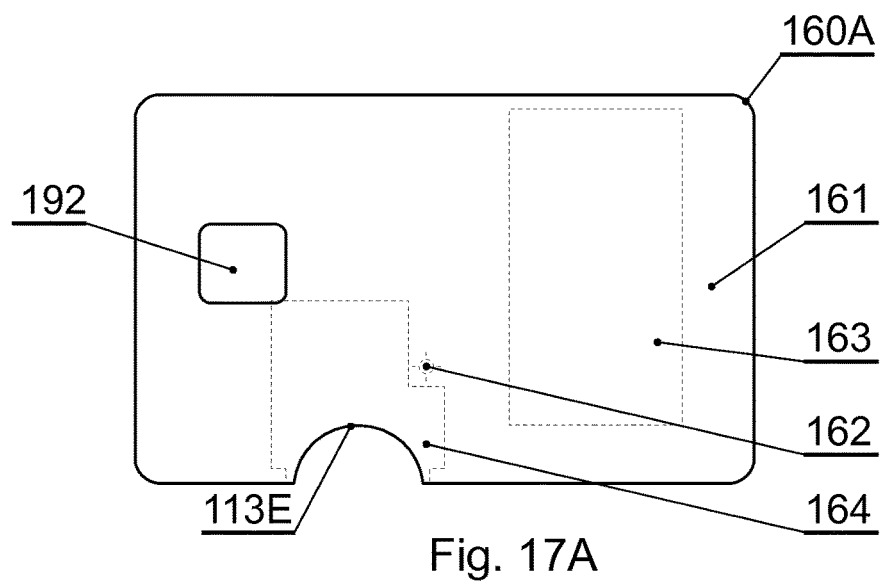
FIGS. 17A-E show a combination of other two previous layers into a single layer.
Figure 17B:
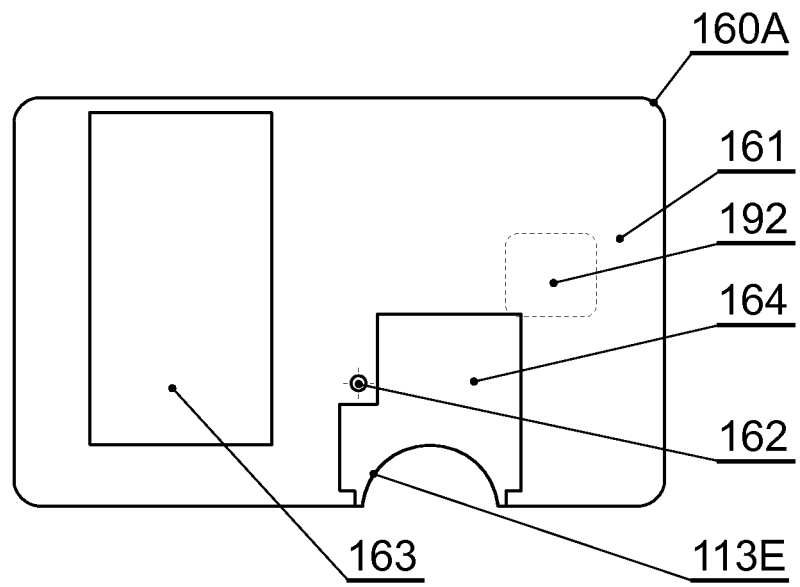
Figure 17C:
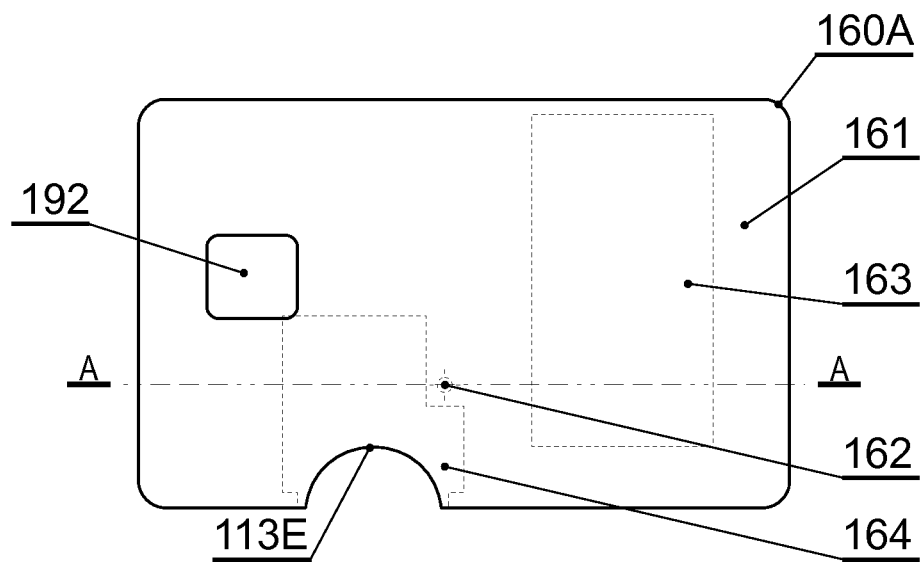
Figure 17C:
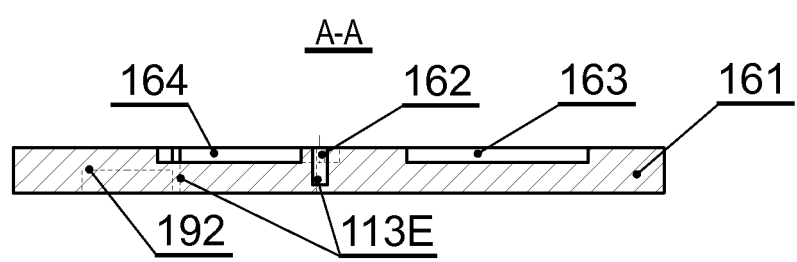
Figure 17D:
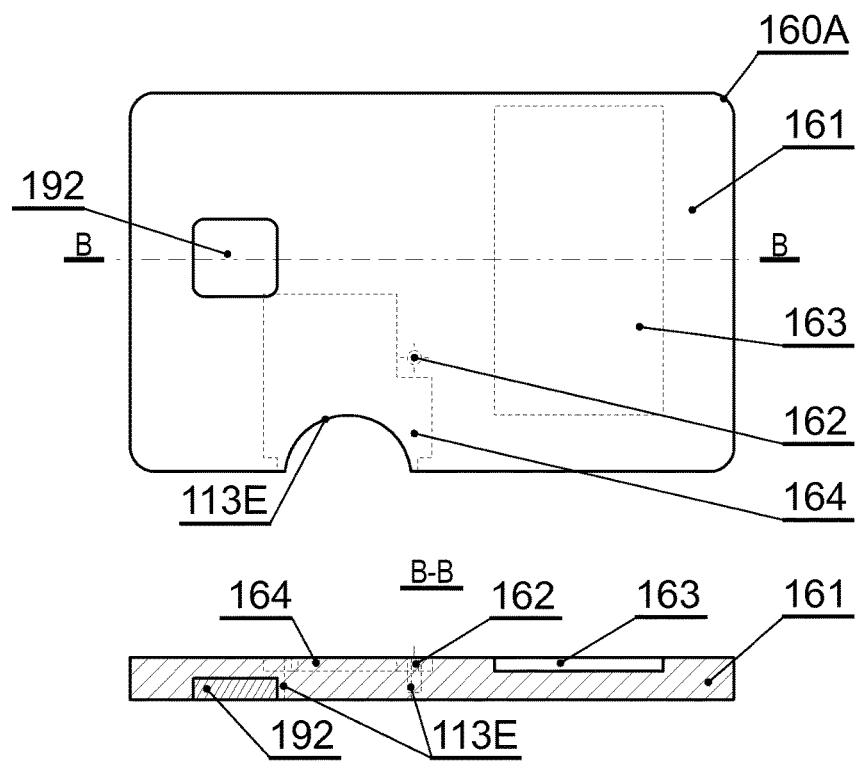
Figure 17E:
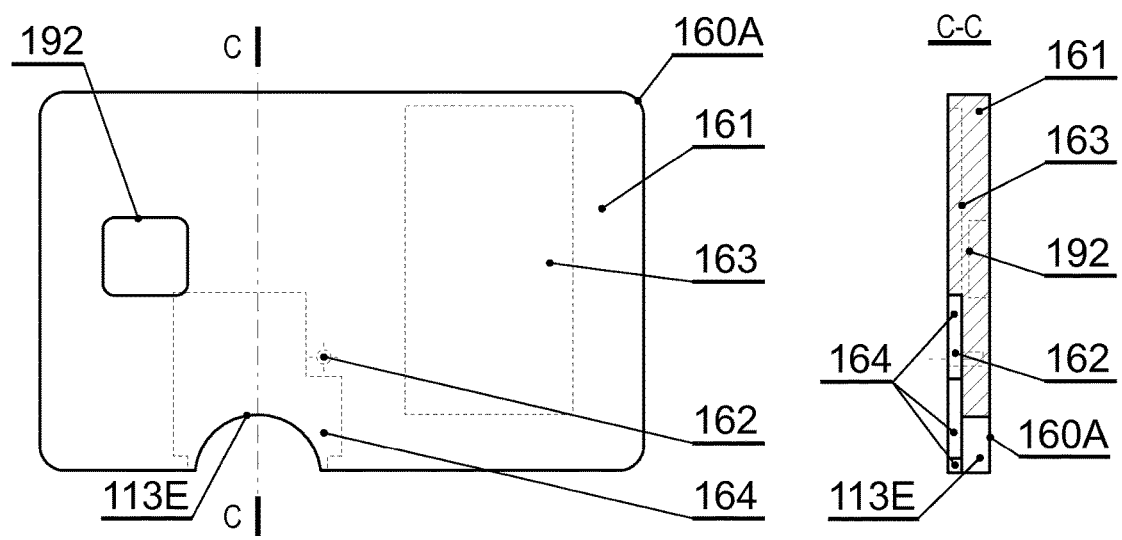

FIG. 15 presents cross-sections of all aforementioned layers as well as their assembled view.

FIGS. 16A-D show a combination of two previous layers into a single layer. The informative layer (110) and the stationary shield layer (120) are combined in order to form a single combined layer (110A). All elements of the combined layer have been described with reference to the previous drawings.

FIGS. 17A-E show a combination of other two previous layers into a single layer.

The shield support layer (160) and the sixth layer (190) are combined in order to form a single combined layer (160A). All elements of the combined layer have been described with reference to the previous drawings.

Figure 18:
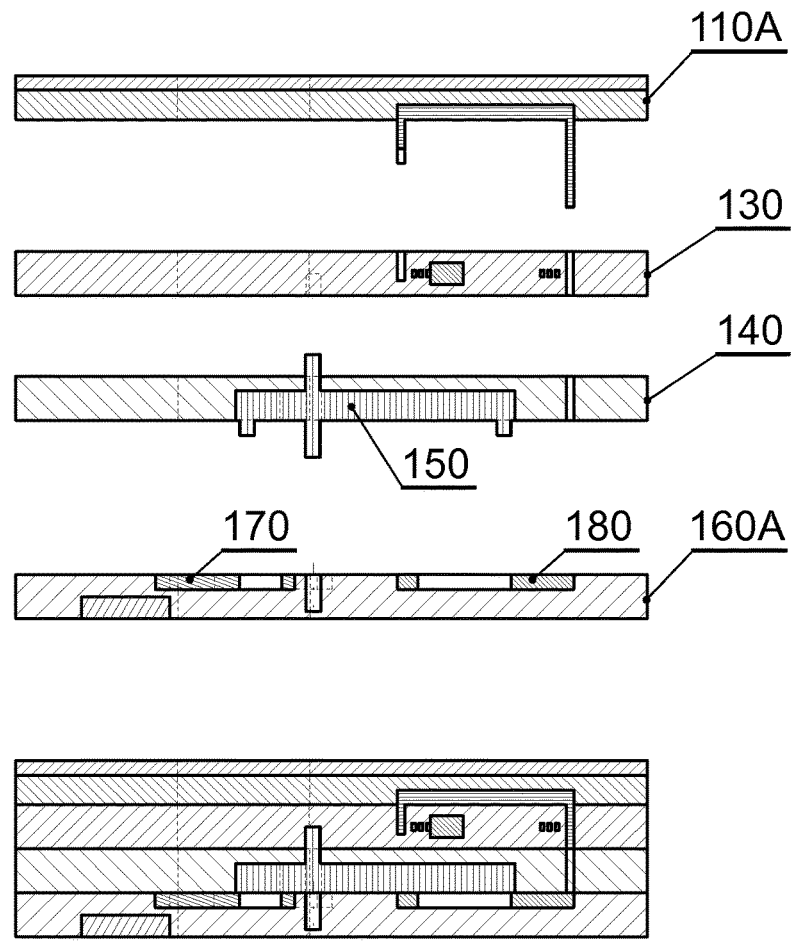
FIG. 18 presents cross-sections of all aforementioned combined layers of FIGS. 16A-E and 17A-E as well as their assembled view.

FIG. 18 presents cross-sections of all aforementioned combined layers of FIGS. 16A-15D and 17A-E (110A, 130, 140 and 160A) as well as their assembled view. Thus, it may be said that the final RFID card is assembled from four layers.

Figure 19A:
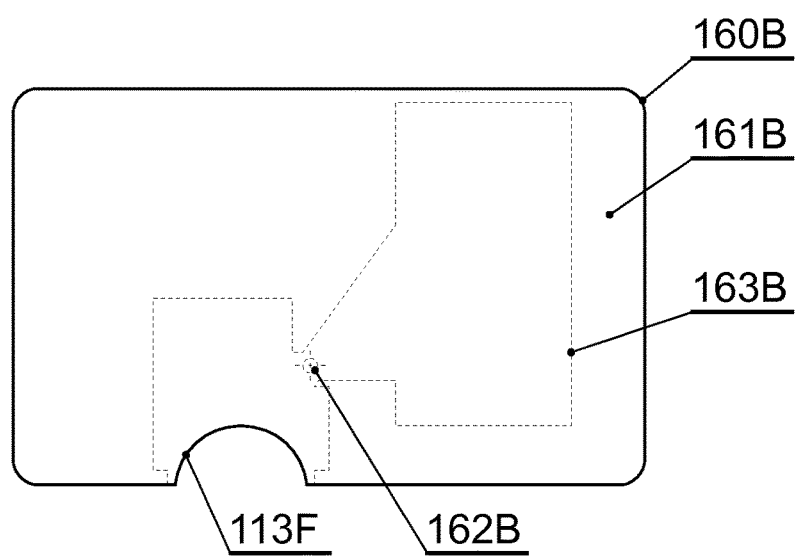
FIG. 19A shows a modified shield support layer designed to hold both the lever and shields on same layer according to another embodiment of the present invention.
Figure 19B:
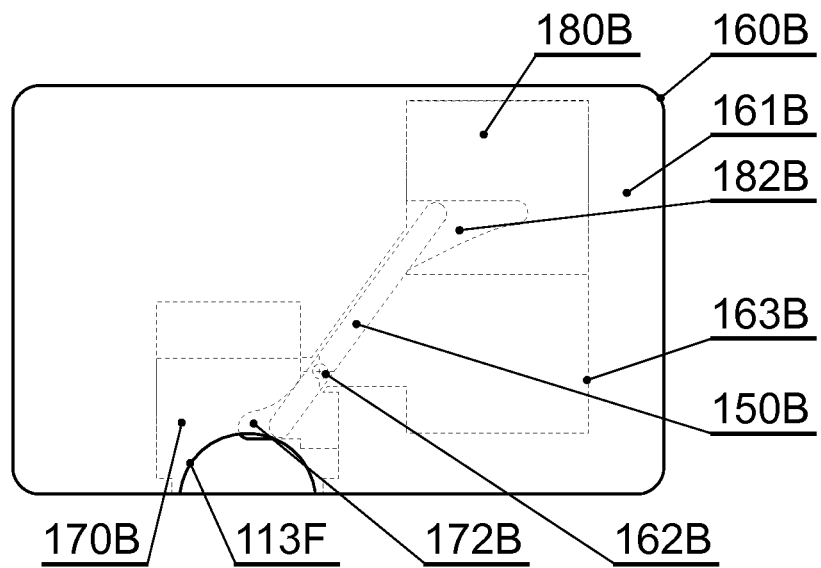
FIGS. 19B-D show the modified shield support layer with shield, actuator and lever assembled with respective cross-sections.
Figure 19C:
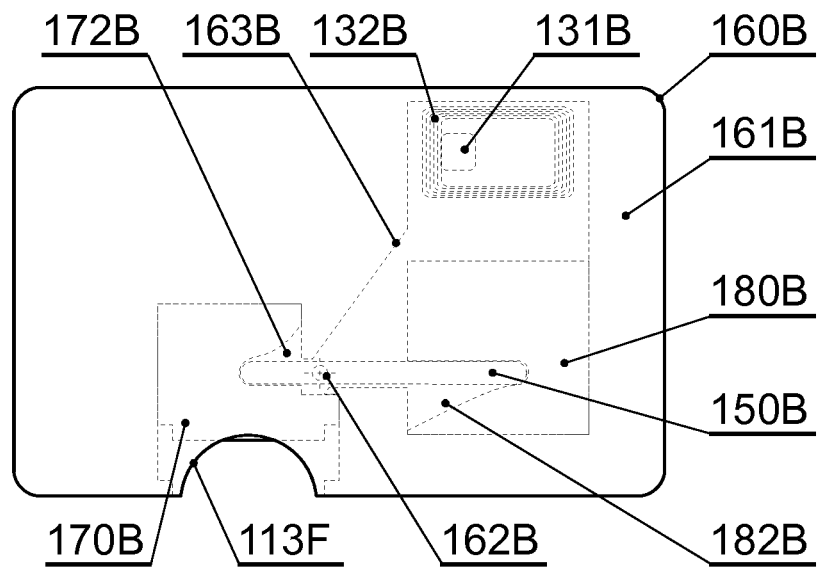

FIG. 19A-C show another embodiment of the present invention, in which the lever (150A) does not need the mandrels (152) and (153) described by the aforementioned embodiment of the present invention and therefore can be assembled within the shield support layer described in the aforementioned embodiment of the present invention.

FIG. 19A presents the schematics of the shield support layer (160B). The layer is preferably made of PVC, polyethylene or polycarbonate or similar material substrate (161B). The layer (161B) has a recess or a cut-out or an opening (163B), in which the shield (180B) and the shield actuator (170B) can slide in their respective locations. The layer (160B) has also an opening or a recess (162B) for pivotably mounting the lever (150B). The layer (160B) also comprises a cut out portion (113F) allowing for actuating the lever actuator (170B).

FIGS. 19B-C show the layer (160B) assembled with the shield (180B) and actuator (170B) and lever (150B) in two of many possible positions.

The lever (150B) rotates around the fulcrum (162B) and can be attached at that fulcrum in a manner similar to previously described embodiments of the present invention.

The lever (150B) can be rotated by the actuator (170B) and move the shield (180B) thanks to the cut-outs (182B) and (172B) in the shield (180B) and actuator (170B) respectively, which thanks to their shape can hold any position of the lever (150B). Hence, moving the actuator (170B) from first position (FIG. 9B) to the second position (FIG. 9C) uncovers the RFID antenna (132B) and/or chip (131B) allowing for contactless communication.

Figure 19D:
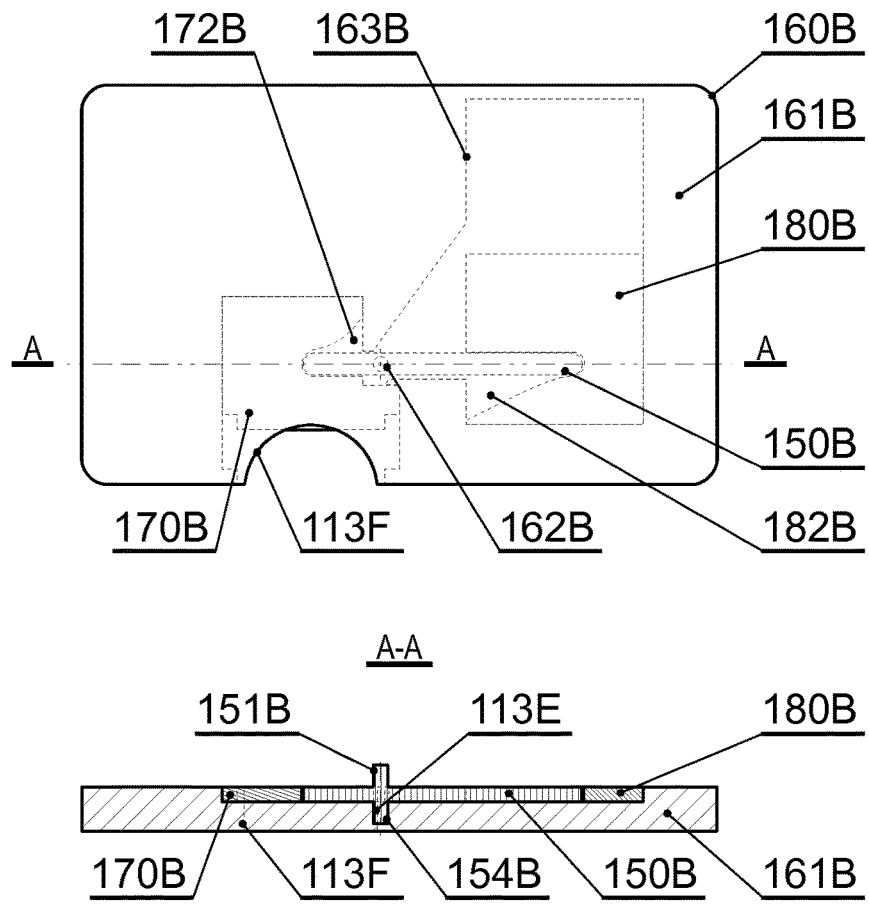

FIG. 19D presents the layer (160B) and the A-A cross-section of the layer (160B). All items are marked with the reference to the previous figures. Additionally the hinges (151B) and (154B) are presented showing how the lever (150B) is assembled with the adjacent layers.

Figure 20A:
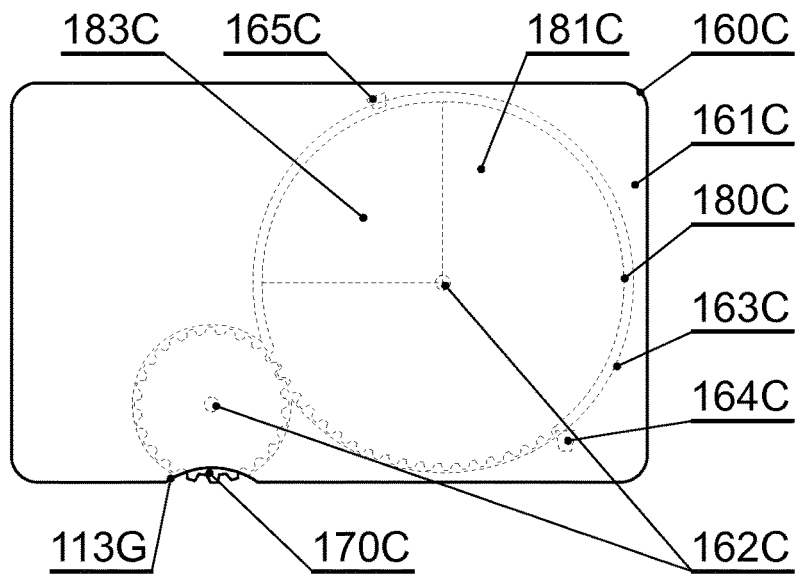
FIGS. 20A-B present another embodiment of the present invention using a rotatable wheel as a shield.
Figure 20B:
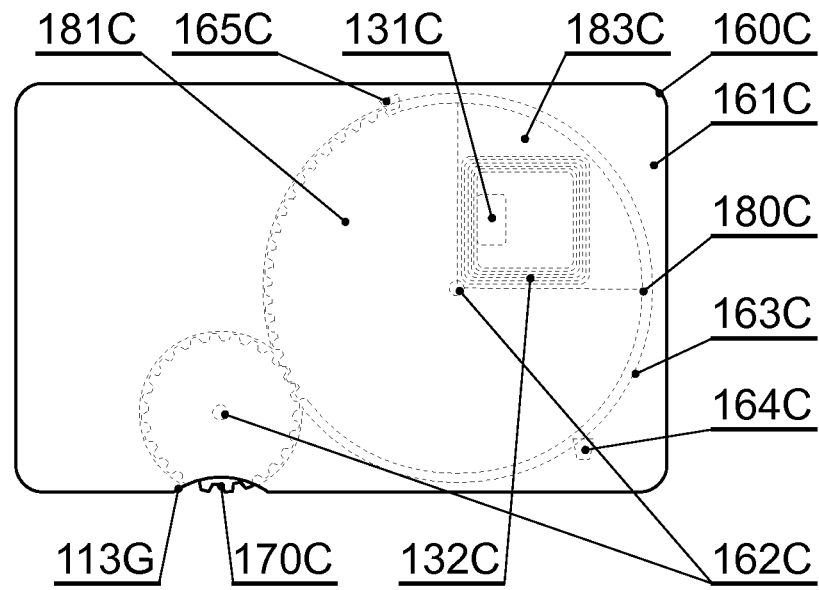

FIGS. 20A-B present yet another embodiment of the present invention where the shield (180C) and actuator (170C) are of a circular shape and rotate between first (closed) and second (open) positions. Both shield (180C) and actuator (170C) are assembled into the shield support layer (160C). The layer (160C) is preferably made of PVC, polyethylene or polycarbonate or similar material substrate (161C). In one embodiment the movable shield (180C) and actuator (170C) are toothed and engage each other so that a rotation of the actuator (170C) results in rotation of the movable shield (180C).

The shield (180C) comprises the shield body (181C) that in first position covers the RFID chip (131C) and/or antenna (132C) as presented in FIG. 20A. The shield (180C) also comprises a cut-out portion (183C). The layer (160C) has a cut-out or opening (163C) that allows for assembly of the shield (180C) and actuator (170C). The layer further comprises holes (162C) that allow for rotation of the shield (180C) and actuator (170C) and serve as their fulcrum (a pivotable mount). The layer (160C) further comprises two stop elements (164C) and (165C) that limit the rotation of the shield (180C). The layer (160C) also comprises a cut out portion (113G) allowing for rotating the lever actuator (170C).

The lever actuator (170C) rotates the shield (180C) moving it between first and second positions. FIG. 20B presents the same layer (160C) with the shield (180C) in the second (open) position allowing for contactless communication with the RFID chip (131C) and/or antenna (132C). All markings are made with the reference to FIG. 20A.

Figure 21A:
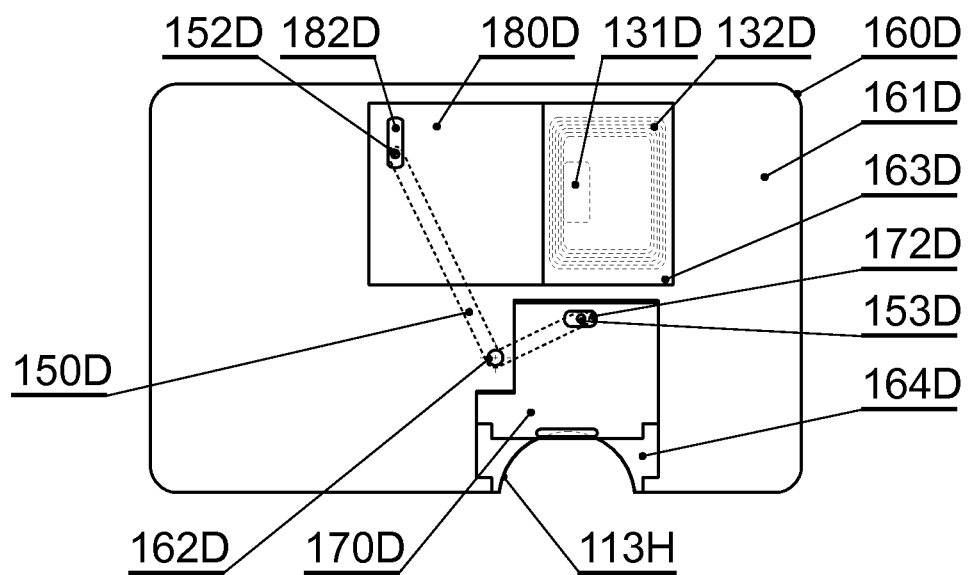
FIGS. 21A-B show another embodiment of the present invention that uses another shape of the lever to shield and RFID chip located differently in the card.
Figure 21B:
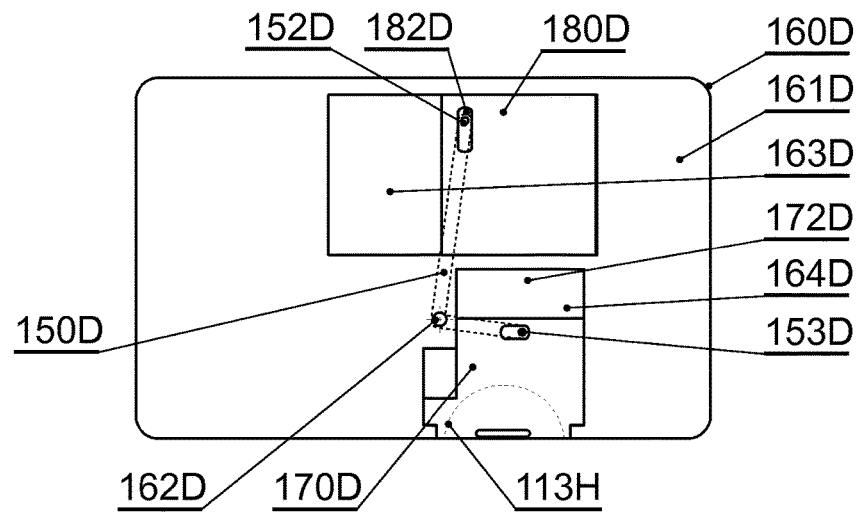

FIGS. 21A-B present yet another embodiment of the present invention showing yet another shape of the lever (150D). FIG. 21A presents the shield support layer (160D) with shield (180D) and actuator (170D) and lever (150D) assembled and in second position allowing for contactless communication with the RFID chip (131D) and/or antenna (132D). The layer (160D) is preferably made of PVC, polyethylene or polycarbonate or similar material substrate (161D) and contains cut-outs or openings (163D) and (164D) in which shield (180D) and actuator (170D) can slide in a similar manner to previous embodiments of the present invention.

The layer (160D) also contains a hole or a recess (162D), which pivotably holds the lever (150D) and is the fulcrum of the lever (150D). In this embodiment a right angle lever is used, the lever (150D) comprising two perpendicular rods and of equal or different length. In other embodiments an angle other than a right angle may be present between the respective arms of the lever (150D).

The layer (160D) also comprises a cut out portion (113H) allowing for rotating the lever actuator (170D). The shield (180D) and actuator (170D) comprise cut-outs (182D) and (172D) respectively that allow for the rotation of lever (150D) and movement of its mandrels (152D) and (153D) respectively. FIG. 21B presents the same layer (160D) with the shield (180D) in the first (closed) position. All markings are made with reference to FIG. 21A.

Figure 22A:
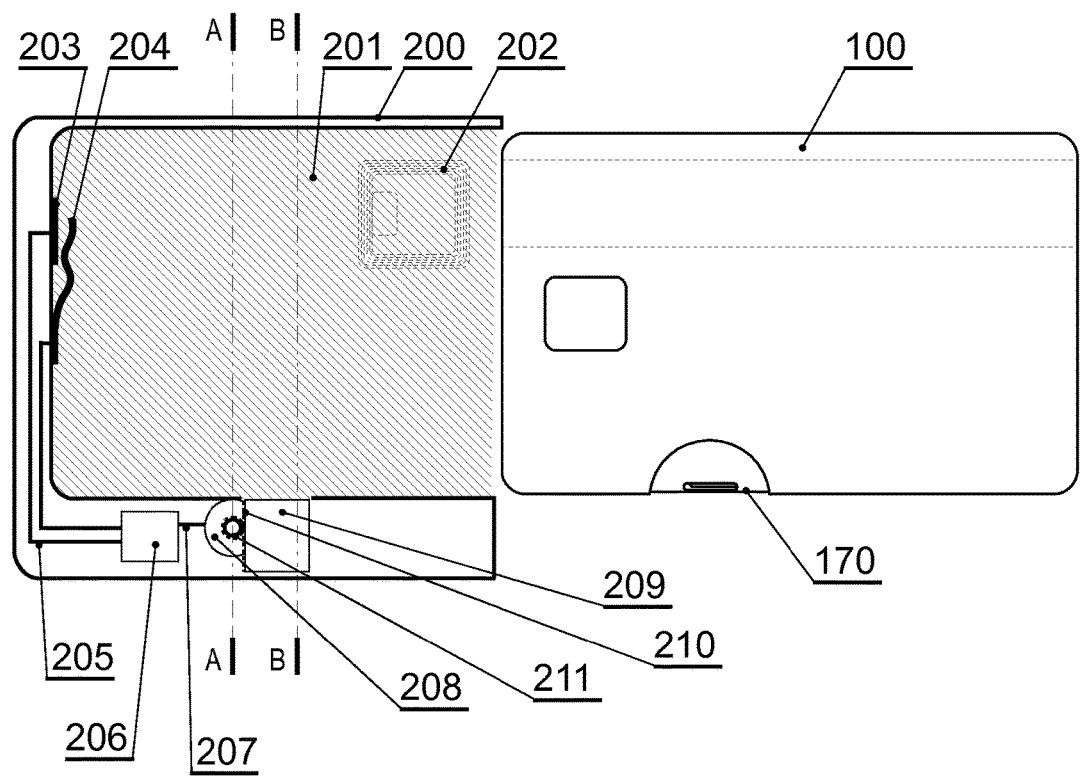
FIGS. 22A-C show an exemplary reader device designed for contactless communication with the cards described using some exemplary embodiments of the present invention.

FIG. 22A present an exemplary device capable of moving (pushing) the shield actuator (170) or (170B) or (170D) or similar. Typically this device is a reader capable of automatically switching the RFID functionality on and off. The device comprises a chassis (200) further comprising a cut-out portion (201) capable of partially holding a contactless communication card (100). The device further comprises an RFID transponder (202) capable of communication with the RFID chip and/or antenna contained in the card (100).

Figure 22B:
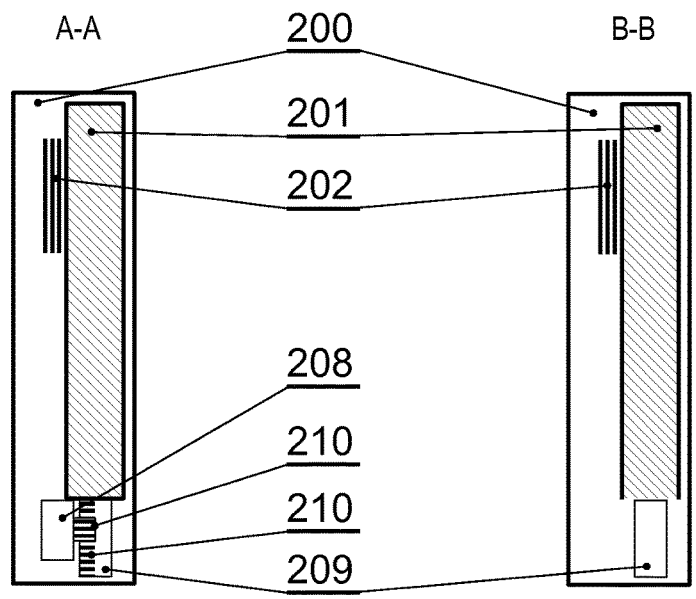

The device may further comprise contacts (203) and (204) which are connected (205) to a controller chip (206) which is communicatively connected (207) to an actuation means e.g. to a motor (208). FIG. 22B presents an A-A and a B-B cross-sections marked with reference to FIG. 22A.

Figure 22C:
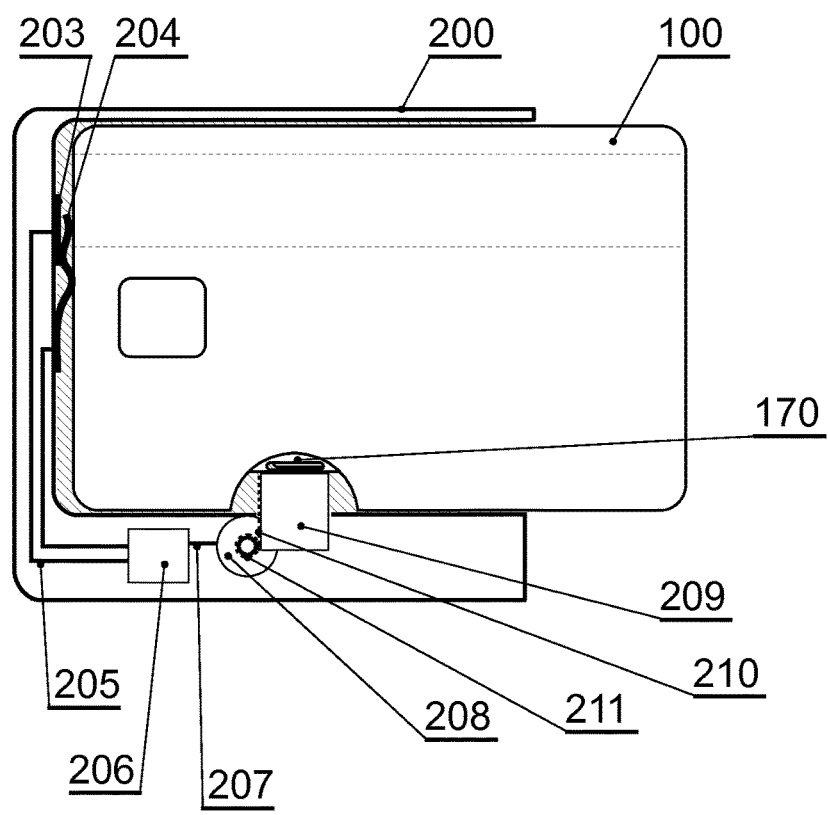

When the contacts (203) and (204) touch, the chip (206) enables actuation means that engage the actuator at the card (100). The actuation means may comprise the motor (208) that is configured to rotate its cog (211) and move the pusher's (209) rack (210) and therefore the pusher (209) itself inward into the cut-out (201). This situation is presented in FIG. 22C. The pusher (209) is pushed into the cut-out (201) and presses the actuator (170). The contacts (203) and (204) touch. When the card (100) is slid out of the device, the contacts (203) and (204) stop touching and the chip (206) immediately retracts the pusher (209).

An apparent extension of the device may be a mechanism that also retracts the actuator (170) or the device may assume that the card (100) has a push-back mechanism embedded that pushes the actuator (170) back as described in previous embodiments of the present invention. This is in no way limiting to the present invention.

It is apparent by the description of the presented embodiments of the present invention that the levers used in the embodiments and/or the shields and/or other elements may be adjusted to differently move or slide or rotate in order to ensure proper first (closed) and second (open) positions of the shield and facilitate different locations of the RFID chip and/or antenna which is in no way limiting to the present invention. It is also clear that the lever, the actuator and the shield need to be made of sufficiently rigid materials to allow their proper movement. The rigidness depends naturally on size and thickness of the respective parts.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

The invention claimed is:

1. A device comprising a Radio Frequency Identification (RFID) transponder and means for selectively controlling the Radio Frequency Identification transponder communication, the device comprising:
   a first, internal, electromagnetic shield fixed on one side of the Radio Frequency Identification transponder's antenna; and
   a second, internal, electromagnetic, movable shield on another side of the Radio Frequency Identification transponder's antenna;
   wherein the device further comprises an internal actuator configured to operate a movable mechanism, influencing a position of the movable shield, such that when the internal actuator is in a first position, the movable shield is in a first position allowing communication with the Radio Frequency Identification transponder and when the internal actuator is in a second position, the movable shield is in a second position, in which the movable shield blocks all contactless communication with the Radio Frequency Identification transponder
   wherein the internal actuator is a lever actuator and the movable mechanism is a lever,
      the lever pivots at the lever's fulcrum and includes a first engaging mandrel and a second engaging mandrel;
      the lever actuator has an elongated opening;
      the movable shield has an elongated opening;
      wherein the first engaging mandrel slidably engages the elongated opening of the movable shield; and
      wherein the second engaging mandrel slidably engages the elongated opening of the lever actuator;
      such that the movable shield may be moved between said first and said second positions.

2. The device according to claim 1 wherein the lever is right angle lever is used, the right angle lever including two perpendicular rods.

3. The device according claim 1 wherein the first engaging mandrel and the second engaging mandrel are situated on the same side of the lever and in proximity to the opposite ends of the lever.

4. The device according to claim 1 wherein the device comprises a push-back mechanism configured to return the internal actuator that has been pushed, to the internal actuator's initial position, when said push-back mechanism has been released.

5. The device according to claim 1 wherein the movable shield and internal actuator are toothed and engage each other so that a rotation of the internal actuator results in rotation of the movable shield.

6. A reader device for a contactless communication device, the contactless communication device comprising:
   a Radio Frequency Identification (RFID) transponder and means for selectively controlling the Radio Frequency Identification transponder communication;
   a first, internal, electromagnetic shield fixed on one side of the Radio Frequency Identification transponder's antenna and
   a second, internal, electromagnetic, movable shield on another side of the Radio Frequency Identification transponder's antenna
   wherein the contactless communication device further comprises an internal actuator configured to operate a movable mechanism, influencing a position of the movable shield, such that when the internal actuator is in a first position, the movable shield is in a first position allowing communication with the Radio Frequency Identification transponder and when the internal actuator is in a second position, the movable shield is in a second position, in which the movable shields blocks all contactless communication with the Radio Frequency Identification transponder;
   wherein the reader device comprises:
   a holder configured to hold the contactless communication device;
   a Radio Frequency Identification transponder configured to communicate with the Radio Frequency Identification transponder of the contactless communication device;
   a controller, which is communicatively connected to an actuation means selectively engaging the internal actuator of the contactless communication device
   wherein the internal actuator is a lever actuator and the movable mechanism is a lever,
      the lever pivots at the lever's fulcrum and includes a first engaging mandrel and a second engaging mandrel;
      the lever actuator has an elongated opening;
      the movable shield has an elongated opening;
      wherein the first engaging mandrel slidably engages the elongated opening of the movable shield; and
      wherein the second engaging mandrel slidably engages the elongated opening of the lever actuator;
      such that the movable shield may be moved between said first and said second positions.

* * * * *